US012791461B2

(12) United States Patent
Krishnamoorthi et al.

(10) Patent No.: US 12,791,461 B2
(45) Date of Patent: Nov. 10, 2026

(54) POROSITY CHARACTERISTICS OF THERMAL SPRAY COATINGS TECHNICAL FIELD

(71) Applicants: Rolls-Royce Corporation, Indianapolis, IN (US); Rolls-Royce North American Technologies, Inc., Indianapolis, IN (US)

(72) Inventors: Sidharth Krishnamoorthi, Indianapolis, IN (US); Matthew R. Gold, Indianapolis, IN (US); Robert Golden, Indianapolis, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 271 days.

(21) Appl. No.: 18/661,042

(22) Filed: May 10, 2024

(65) Prior Publication Data

US 2025/0347608 A1 Nov. 13, 2025

(51) Int. Cl.

| | |
|---|---|
| ***G01N 15/08*** | (2006.01) |
| ***C23C 4/06*** | (2016.01) |
| ***G06V 10/60*** | (2022.01) |

(52) U.S. Cl.

CPC ............. *G01N 15/088* (2013.01); *C23C 4/06* (2013.01); *G06V 10/60* (2022.01)

(58) Field of Classification Search

CPC ......... G01N 15/088; C23C 4/06; G06V 10/60

See application file for complete search history.

(56) References Cited

U.S. PATENT DOCUMENTS 4,797,906 A * 1/1989 Smith .................. G01N 15/088 250/269.1
6,516,080 B1 2/2003 Nur
(Continued)

FOREIGN PATENT DOCUMENTS

CN 120747144 A * 10/2025 ............... G06T 7/11
KR 101871538 B1 6/2018
(Continued)

OTHER PUBLICATIONS

U.S. Appl. No. 18/661,009, filed May 10, 2024, naming inventors Krishnamoorthi et al.
(Continued)

*Primary Examiner* — Francis C Gray
(74) *Attorney, Agent, or Firm* — Shumaker & Sieffert, P.A.

(57) ABSTRACT

A method includes receiving, by a computing device, an image indicative of a cross-section of a thermally-sprayed layer. The thermally-sprayed layer defines a porosity comprising a void volume of the thermally-sprayed layer. The image comprises a matrix of pixels, each pixel in the matrix of pixels defining a respective luminance value of a plurality of luminance values. The method includes identifying, based on the luminance values, at least one pixel that is indicative of a void volume in the thermally-sprayed layer. The method includes calculating, based on the at least one pixel that is indicative of the void volume in the thermally-sprayed layer, a total porosity of the thermally-sprayed layer. The method includes determining, by the computing device and based on the at least one pixel that corresponds to a void volume in the thermally-sprayed layer, a quantification of a spatial homogeneity of the porosity of the thermally-sprayed layer.

20 Claims, 10 Drawing Sheets

(56) References Cited

U.S. PATENT DOCUMENTS

| | | | | |
|---|---|---|---|---|
| 8,170,799 | B2 | 5/2012 | Dvorkin et al. | |
| 9,118,872 | B1 | 8/2015 | Goodman et al. | |
| 10,891,462 | B2 | 1/2021 | Zhao | |
| 11,087,463 | B2 | 8/2021 | Peng | |
| 11,816,828 | B2 * | 11/2023 | Cobb | G01J 5/02 |
| 2011/0170780 | A1 | 7/2011 | Vaddadi et al. | |
| 2015/0159020 | A1 * | 6/2015 | Sato | C04B 35/04 106/286.2 |
| 2022/0252757 | A1 | 8/2022 | Alanazi et al. | |
| 2025/0044210 | A1 * | 2/2025 | Cavalcanti De Paula | G01N 24/081 |
| 2025/0231150 | A1 * | 7/2025 | Gold | C23C 24/04 |

FOREIGN PATENT DOCUMENTS

| | | | | |
|---|---|---|---|---|
| WO | 2015024020 A1 | | 2/2015 | |
| WO | WO-2019151889 A1 | * | 8/2019 | G01N 15/088 |

OTHER PUBLICATIONS

U.S. Appl. No. 18/661,124, filed May 10, 2024, naming inventors Krishnamoorthi et al.

ASTM International, "Standard Test Methods for Determining Area Percentage Porosity in Thermal Sprayed Coatings", Jun. 2023, 8 pp.

Bergant et al., "Porosity Evaluation of Flame-Sprayed and Heat-Treated Nickel-Based Coatings Using Image Analysis", Jan. 27, 2011, 10 pp.

Brandley et al., "Mapping carbon nanotube orientation by fast fourier transform of scanning electron micrographs", Apr. 24, 2018, 10 pp.

Karimi et al., "Effects of remelting processes on porosity of NiCrBSi flame sprayed coatings", Feb. 24, 2016, 8 pp.

Schilcher et al., "Quantifying inhomogeneity of spatial point patterns", Jan. 10, 2017, 17 pp.

Deshpande et al., "Application of image analysis for characterization of porosity in thermal spray coatings and correlation with small angle neutron scattering", Surface and coatings technology, vol. 187, No. 1, Elsevier, Oct. 1, 2004, 11 pp.

Faraoun et al., "Improvement of thermally sprayed abradable coating by microstructure control", Surface and Coatings Technology, vol. 201, No. 6, Elsevier, Dec. 4, 2006, 10 pp.

Mahendru et al., "Artificial intelligence models for analyzing thermally sprayed functional coatings", Journal of Thermal Spray Technology, vol. 32, No. 2, Springer, Feb. 28, 2023, 13 pp.

Montavon et al., "Microstructural index to quantify thermal spray deposit microstructures using image analysis", Journal of Thermal Spray Technology, vol. 7, No. 2, Springer, Jun. 1998, 13 pp.

Schorr et al., "Characterization of thermal spray coatings", Materials characterization, vol. 42, Elsevier, Feb. 3, 1999, 8 pp.

* cited by examiner

POROSITY CHARACTERISTICS OF THERMAL SPRAY COATINGS TECHNICAL FIELD

TECHNICAL FIELD

The disclosure relates to thermal spray techniques, coating systems, and image analysis techniques.

BACKGROUND

Thermal spray systems are used in a wide variety of industrial applications to coat targets with coating material to modify or improve the properties of the target surface. Coatings may include thermal barrier coatings, hard-wear coatings, environmental barrier coatings, or the like. Thermal spray systems use heat generated electrically, by plasma, or by combustion to heat material injected in a plume, so that molten material propelled by the plume contact the surface of the target. Upon impact, the molten material adheres to the target surface, resulting in a coating.

SUMMARY

Thermal spray is a common application technique for metallic and/or ceramic coatings. In a thermal spray process, heat and fast-flowing gas accelerate a powder to at least partially melt and deposit the powder on a surface on the substrate. The melted powder impacts the substrate and flattens, resulting in layers of "splats" to build up the coating layer thickness. The microstructure of the thermally-sprayed coating may include lamellae (e.g., flattened powders) and void volumes. The sum of void volumes in the thermally-sprayed layer may be termed a porosity of the layer. The porosity may be expressed as a fraction or volume percentage of the thermally-sprayed layer closed.

It may be desirable to determine the porosity of the thermally-sprayed layer and to determine the distribution of the porosity within the thermally-sprayed layer. Determining these characteristics of the thermally-sprayed layer may allow for better understanding of the coating layer quality, potential failure modes, and/or selective tailoring of the thermal spray process to apply a coating layer that includes relatively more desirable characteristics. For example, a thermally-sprayed layer which has a relatively more homogenous distribution of void volumes within the thermally-sprayed layer may exhibit improved thermal and/or wear resistance when compared to a thermally-sprayed layer which has a relatively heterogeneous distribution of void volumes within the thermally-sprayed layer. For example, the thermally-sprayed layer with a heterogenous distribution may include clusters of void volumes, which may lead to weak spots in in the layer, which may in turn lead to failure of the thermally-sprayed layer. If a thermally-sprayed layer is all or a portion of a coating system, a failure of the thermally-sprayed layer may result in failure of the coating system and damage to a substrate component.

Certain techniques for analyzing the porosity of a thermally-sprayed layer may include capturing and analyzing an image of a cross-section of the thermally-sprayed layer. The image may be compared by a skilled operator to an image of a desired coating layer to determine the porosity and/or the homogeneity of the distribution of the porosity, or other characteristics. Several problems may arise with these and other techniques. For example, it may be difficult or impossible to determine the porosity with the required precision by visual comparison. Similarly, visual techniques may not allow for quantification of the spatial homogeneity of porosity in the thermally-sprayed layer. Thus, quality control and adaptive control of thermal spray processes may be relatively difficult when using such image analysis techniques.

According to one or more examples of the present disclosure, advanced image analysis techniques may be executed, which may allow for further determination and quantification of characteristics and quality of the thermally-sprayed coating layer, and may further allow for selective tailoring of parameters of a thermal spray system (e.g., a thermal spray gun) in the same or in subsequent thermal spray processes. For example, image processing techniques disclosed herein may quantify the porosity and/or quantify the spatial homogeneity of the porosity of the coating layer. These quantifications may be used as a quality check of the thermal spray process and/or parts, or may be used to selectively tailor the deposition of the same or a subsequent thermally-sprayed layer.

In aspects of the present disclosure, an image processing technique may include receiving, by a computing device, an image of a cross-section of a thermally-sprayed layer. The image may be made up of a matrix of pixels, with each pixel of the matrix of pixels defining a respective luminance value of a plurality of luminance values. The image processing technique may include determining a total porosity of the thermally-sprayed layer by dividing the number of pixels that are indicative of a void volume in thermally-sprayed layer the image by the total number of pixels in the image. The technique may include forming an analysis window within the image. The analysis window may surround a set of pixels representative of a portion of the thermally-sprayed layer within the image. The technique may include determining a regional porosity of the portion of the thermally-sprayed layer in the analysis window by dividing the number of pixels that are indicative of a void volume in the analysis window by the total number of pixels in the analysis window, and calculating a porosity deviation parameter by comparing the regional porosity to the total porosity. The technique may further include iteratively moving the analysis window to a plurality of locations within the image, and calculating a porosity deviation parameter at respective location of the plurality of locations. The technique may include determining a range of porosity deviation parameters, and determining a spatial homogeneity parameter based on the range of porosity deviation parameters. The spatial homogeneity parameter may be indicative of the homogeneity of the porosity of the thermally-sprayed layer.

In accordance with one or more examples of the present disclosure, a method includes receiving, by a computing device, an image indicative of a cross-section of a thermally-sprayed layer. The thermally-sprayed layer defines a porosity including a void volume of the thermally-sprayed layer. The image includes a matrix of pixels, each pixel in the matrix of pixels defining a respective luminance value of a plurality of luminance values. The method includes identifying, by the computing device and based on the plurality of luminance values, at least one pixel that is indicative of a void volume in the thermally-sprayed layer. The method includes calculating, by the computing device and based on the at least one pixel that is indicative of the void volume in the thermally-sprayed layer, a total porosity of the thermally-sprayed layer. The method also includes determining, by the computing device and based on the at least one pixel that is indicative of a void volume in the thermally-sprayed layer, a quantification of a spatial homogeneity of the porosity of the thermally-sprayed layer.

In accordance with one or more examples of the present disclosure, a non-transitory computer-readable storage medium has stored thereon instructions that, when executed, configure a processor. The processor is configured to receive an image indicative of a cross-section of a thermally-sprayed layer, the thermally-sprayed layer defining a porosity. The image includes a matrix of pixels, and each pixel in the matrix of pixels defines a luminance value. The processor is configured to identify, based on the luminance values, at least one pixel that corresponds to a void volume in the thermally-sprayed layer. The processor is also configured to calculate, based on the at least one pixel that is indicative of the void volume in the thermally-sprayed layer, a total porosity of the thermally-sprayed layer. The processor is further configured to determine, based on the at least one pixel that is indicative of a void volume in the coating layer, a quantification of a spatial homogeneity of the porosity of the thermally-sprayed layer.

In accordance with one or more examples of the present disclosure, a system includes a thermal spray gun configured to apply a thermally-sprayed coating layer to a substrate. The system includes an imaging device configured to capture an image indicative of a cross-section of the thermally-sprayed layer. The thermally-sprayed layer defines a porosity. The image includes a matrix of pixels, and each pixel in the matrix of pixels defines a luminance value. The system includes a computing device. The computing device is configured to receive the image indicative of the cross-section of the thermally-sprayed layer. The computing device is further configured to identify, based on the luminance values, at least one pixel that corresponds to a void volume in the thermally-sprayed layer. The processor is configured to calculate, based on the at least one pixel that is indicative of the void volume in the thermally-sprayed layer, a total porosity of the thermally-sprayed layer. The computing device is further configured to determine, based on the at least one pixel that corresponds to a void volume in the thermally-sprayed layer, a quantification of a spatial homogeneity of the porosity of the thermally-sprayed layer.

The details of one or more examples are set forth in the accompanying drawings and the description below. Other features, objects, and advantages will be apparent from the description and drawings, and from the claims.

BRIEF DESCRIPTION OF DRAWINGS

FIG. 7A-8E are micrographs illustrating example thermally-sprayed layers, each thermally-sprayed layer defining a porosity. The example thermally-sprayed layers may be analyzed using image processing techniques according to the present disclosure.

DETAILED DESCRIPTION

Figure 1B:
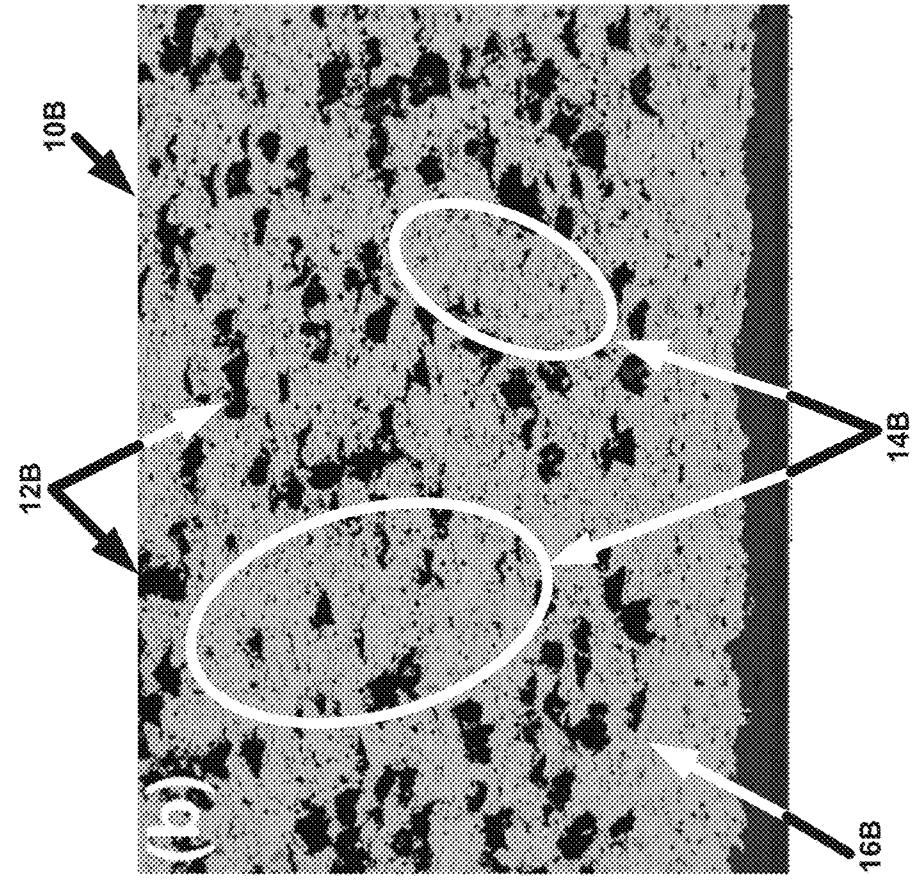
FIGS. 1A and 1B are micrographs illustrating cross-sections of two example thermally-sprayed layers, each thermally-sprayed layer defining a porosity, according to one or more examples of the present disclosure.

The disclosure describes systems and techniques for analyzing an image of a thermally-sprayed layer ("layer") to determine one or more attributes of the layer. The layer may be a coating layer, which may be applied by a thermal spray system that includes a thermal spray gun. Thermally-sprayed layers of the present disclosure may include metallic and/or ceramic materials, and may be formed as thermal barrier coatings, hard-wear coatings, environmental barrier coatings, abradable coatings, or the like. Such coatings may have applications in the aerospace industry, such as on portions of gas turbine engines.

During a thermal spray process, the spray gun receives spray material (e.g., a powder or mixture of powders and/or binders and/or fugitive materials) and a carrier gas, at least partially melts the spray material, and directs the at least partially melted spray material toward a spray target using the carrier gas. The at least partially melted spray material contacts the spray target to provide a coating of the spray material on the spray target. In some examples, the quality of the coating on the spray target may depend on process attributes including, for instance, the spray material composition and flow rate; the carrier gas composition, temperature, and flow rate; the spray target composition and shape; the condition of the at least one component (e.g., the spray gun); and the like. Unsatisfactory characteristics may result from variances in process attributes, including process parameters, component wear, or both.

The melted spray material impacts the substrate and flattens, resulting in layers of "splats" to build up the coating layer thickness. The resulting microstructure of the layer may include lamellae (e.g., flattened powders) and void volumes (e.g., closed pores, open pores, splat lines, or other empty spaces within the layer). The void volumes, in total, may be called the porosity of the layer, and may be expressed as a volume percentage or a void fraction of the layer. The void volumes may form during a thermal spray process, such as when fugitive materials may volatilize during a coating burnout phase.

The thermal spray process may be designed to impart a target porosity to the layer. The porosity may impart desirable properties to the layer, such as certain abrasion resistance, failure modes, and/or thermal resistance or transfer properties. Accordingly, fugitive materials may be added to the metal and/or ceramic powders at a controlled rate. Generally, it may be desirable to add fugitive materials evenly and proper mixing, such that the porosity of the resulting layer is spatially homogenous and/or distributed with substantially uniform pore sizes. A polymer burnout step may follow the thermal spray process, which may remove the fugitive materials and leave void volumes in the deposited layer. Improper mixing, unpredictable turbulent carrier gas flows, or other process variable may cause fugitive materials to cluster in the deposited layer, resulting in the porosity of the deposited layer being spatially heterogeneous. Portions of the layer where a porosity greater than the target porosity is present may generate a weak spot in the layer, because the layer may be susceptible to fail and break away in such portions. In portions of the layer where a porosity less than the target porosity is present, the layer may exhibit altered abradability and/or thermal properties relative to a layer with porosity within a predetermined range of target porosity.

It may be desirable to determine and quantify the spatial homogeneity of the porosity of the layer to predict material properties of the layer. Certain techniques for analyzing the porosity and/or spatial homogeneity of a layer may include capturing and analyzing an image of a cross-section of the layer. In such techniques, the image may be compared by a skilled operator to an image of a desired layer, and the skilled operator may estimate the porosity and spatial homogeneity of the porosity. However, such techniques may undesirably introduce variance between different operators, introducing human error to the quantification of the porosity of the layer and the spatial homogeneity of the porosity.

According to one or more examples of the present disclosure, advanced image analysis techniques may be executed by a computing device, which may allow for further analysis of characteristics and quality of the layer, and may further allow for selective tailoring of parameters of a thermal spray system (e.g., a thermal spray gun) in the same or in subsequent thermal spray processes. In techniques according to the present disclosure, an image processing technique may include receiving, by a computing device, an image of a cross-section of a layer. The thermally-sprayed layer defines a porosity which includes void volumes in the layer. The received image includes a matrix of pixels, and each pixel of the matrix of pixels defines a respective luminance value of a plurality of luminance values. The computing device may identify at least one pixel that is indicative of a void volume in the thermally-sprayed layer based on the plurality of luminance values. The computing device may calculate a total porosity of the thermally-sprayed layer based on based on the at least one pixel that corresponds to a void volume in the thermally-sprayed layer. The computing device may determine, based on the at least one pixel that corresponds to a void volume in the thermally-sprayed layer, a quantification of the spatial homogeneity of the thermally sprayed layer. In some examples, the quantification may be a numeric index, such as a numeric spatial homogeneity parameter.

In some examples, the computing device calculates the total porosity of the layer that is represented in the image. For example, to calculate the total porosity, the computing device may sum the at least one pixel that is indicative of the void volume within the thermally-sprayed layer and compare the number of pixels indicative of void volume to the total number of pixels in the matrix of pixels that make up the image. The computing device may calculate the total porosity by dividing the number of pixels indicative of void volumes to the total number of pixels in the received image. In some examples, to determine a quantification of the homogeneity of the porosity of the layer, the computing device compares the porosity of different regions of the layer in the image to the total porosity of the image as a whole.

For example, the computing device may determine a quantification of the spatial homogeneity of the porosity of the porosity of the layer by forming an analysis window in the image. The analysis window may be indicative of a region of the layer in the image, and as such may include a portion of the pixels in the matrix of pixels making up the image. For example, the analysis window may include a set of pixels indicative of a portion of the layer in the image. As such, the analysis window may surround a portion of the pixels of the matrix of pixels in the image. The computing device may identify at least one pixel that corresponds to a void volume in the analysis window, and may determine the regional porosity of the portion of the layer in the analysis window by summing the at least one pixel is indicative of the void volume in the analysis window and comparing to a total number of pixels in the analysis window. The computing device may calculate the regional porosity by dividing the number of pixels indicative of void volume in the analysis window by the total number of pixels in the analysis window. The quantification of the spatial homogeneity of the porosity of the layer may be determined at least partially by comparing the determined regional porosity to the determined total porosity of the image as a whole.

The analysis window may be formed in any suitable way. For example, a user may input dimensions of the analysis window, or default settings of the computing device may determine the dimensions of the analysis window based on the dimension of the image. In some examples, the dimensions of the window may be based on the determined total porosity of the layer. For instance, forming the analysis window may include determining a dimensional term by finding the inverse of the total porosity. For example, where the void volume percentage in the image is determined to be 50 volume percent, the inverse of the total porosity may be 1/0.5. Thus, the dimensional term may be 2. Forming the window may also include determining, in pixels, a width and a height of the matrix of pixels making up the image. In one specific example, the image may be 1,280 pixels wide by 720 pixels high. In such an example, the computing device may form the analysis window at 640 pixels wide by 360 pixels high by dividing the dimensions to the matrix of pixels by the total porosity. Other dimensions of the analysis window are also considered, including analysis windows based on other parameters of the layer such as the size distribution of pores in the layer, or analysis windows based on combinations of parameters in the layer.

Basing the dimensions of the analysis window at least partially on the determined porosity of the layer may be advantageous relative to techniques which do not account for the porosity of layer when setting the dimensions of the analysis window. For example, an analysis window that is too small may result in an analysis window capturing only void volume or only metal or ceramic material, which may not be desirable. Conversely, an analysis window that is too large may not be granular enough to capture differences in the spatial homogeneity of the porosity in the image because a plurality or majority of the image may be present in every analysis window. The inventors have found that forming the analysis window based on the total porosity of the image, as described herein, may reduce or eliminate the problems associated with forming the analysis window at too small or too large in dimensions. In some examples, the window dimensions may be at least partially based on the size of the individual pores in the image.

In some examples, comparing the determined regional porosity of the thermally-sprayed layer in the analysis window to the determined total porosity may include determining a porosity deviation parameter. The computing device may determine the porosity deviation parameter by finding the absolute value of a difference between the regional porosity and the total porosity of the layer multiplied by the dimensional term. Building on the example above where the total porosity of the layer in the image is 0.5 as a void fraction, the regional porosity of an example location of the analysis window may be determined to 0.4. The computing device may determine that the absolute value of the difference between the regional porosity and the total porosity is 0.1. The computing device may multiply the determined absolute value by the dimensional term, which may result in a normalized deviation parameter ranging from zero to one. The dimensional term is 2 in this example, as described above. Thus, the computing device may determine that the porosity deviation parameter is 0.2.

In some examples, image analysis techniques disclosed herein may include iteratively moving, by the computing device, the analysis window to a plurality of locations within the image. For example, the computing device may, after determining the porosity deviation parameter of the window in the first location described above, randomly move the analysis window in at least one direction to a second location. The analysis window, in the second location, may surround a second set of pixels indicative of a different portion of the thermally-sprayed layer in the image. The second set of pixels may be considered different from the first set of pixels if the second set of pixels includes at least one pixel that is not included in the first set of pixels. Put differently, the analysis window in the second location may at least partially overlap the analysis window in the first location, or may be in a completely separate location. The computing device may determine a regional porosity of the portion of the layer in the analysis window in the second location, and may determine a porosity deviation parameter of the portion of the layer in the analysis window in the second location by comparing the determined regional porosity to the total porosity. In some examples of the disclosed technique, the computing device may proceed to move the analysis window to a third location, a fourth location, a fifth location, and so on, determining a regional porosity and a porosity deviation parameter at respective location.

In some examples, the plurality of locations to which the computing device may iteratively move the analysis window may include at least 1,000 locations, such as at least 10,000 locations, and the computing device may determine a porosity deviation parameter at each respective location of the plurality of locations. In some examples, the computing device randomly moves the analysis window within the image with each iterative move. For example, the computing device may iteratively move the analysis window in at least one direction with reference to an immediately previous location of the analysis window. Alternatively, the analysis window may be iteratively moved by the according to a pattern. In this way, the regional porosity of each of a variety of portions of the layer in the image may be determined and analyzed for differences from the total porosity. In some examples, iteratively moving the analysis window to a plurality of locations that includes a large number of locations may more fully analyze the image by analyzing the spatial distribution of the porosity in each region of the image.

In some examples, the computing device synthesizes the plurality of porosity deviation parameters calculated by iteratively moving the analysis window and calculating a porosity deviation parameter at each new location. For example, the computing device may synthesize and calculate a quantification of the spatial homogeneity of the porosity of the layer as a spatial homogeneity parameter. The computing device may determine a range of determined porosity deviation parameters, one at each of the plurality of locations of the analysis window. The computing device may set the spatial homogeneity parameter equal to the determined range of determined deviation parameters.

In some examples, before the computing device executes the image analysis technique, the computing device executes one or may functions designed to clean up the image for further analysis. For example, the computing device may optionally normalize the image to correct for any sharp light gradients in the image which may be present from uneven illumination, generating a grayscale image. A normalization step may be applicable when the image is captured by optical microscopy. In some examples, techniques disclosed herein may also include converting, by the computing device and based on the luminance values, the image into a binary image. The described techniques may be performed automatically by the computing device, which may improve the accuracy and/or speed with which the porosity of the layer may be determined.

In some examples, the image indicative of a cross-section of the layer received by the computing device includes a matrix of individual pixels. The image may be a captured through scanning electron microscopy (SEM), and may be in black and white. Alternatively, the image may be captured as an optical micrograph, and may be in color. Each pixel in the matrix of pixels may define a luminance value. The luminance value may be the brightness intensity. In some examples, the brightness intensity may range from a luminance value of zero to indicate a black color to a luminance value of, for example, 255 to indicate a white color. Other scales of luminance values are also considered. Further, other examples are also considered, such as where the maximum luminance value is indicative of a black color and the minimum luminance value is indicative of a white color. In examples where the image is a color image, each pixel in the matrix of pixels may include a luminance value for each of a red color, a yellow color, and a blue color. The technique may include determining an overall luminance value by, for example, summing or averaging the luminance values for each of the red color, the yellow color, and the blue color. The technique may then proceed based on the determined overall luminance value.

In some examples, the image optionally is normalized to reduce or eliminate any brightness gradients that may result from the way the image is captured or other artificial means. For example, a camera flash may cause a central portion of the image to appear brighter than the perimeter of the image, and normalizing the image may correct for the camera flash. In some examples, normalizing the image may include adjusting, by the computing device, a luminance value of at least one pixel of the matrix of pixels. For example, adjusting the luminance value of at least one pixel may include determining a background luminance value for each individual pixel in the matrix of pixels, and subtracting the background luminance value from each individual pixel luminance value. The resulting normalized image may be called a grayscale image. Analysis of the grayscale image, with color removed and/or brightness gradients minimized, may result in a more accurate representation of the layer in the image relative to techniques which do not include a normalization step, because the grayscale image may correct for non-uniform illumination of the cross-section of the coating layer by reducing or eliminating brightness gradients. In some examples, the computing device may generate the grayscale image prior to determining the pixel(s) that correspond to the void volumes(s) in the layer. Thus, further analysis of the image may be performed on an image that is relatively free of noise introduced through non-uniform illumination.

In some examples, the computing device optionally converts the image into a binary image. In some examples, to convert an image into a binary image, the computing device may assign each pixel in the matrix of pixels making up to a luminance value that is equal to a luminance value of a black color or a luminance value that is equal to a white color. By way of example, if the scale of luminance values ranges from zero to 255, those pixels that have a luminance value from zero to 127 may be adjusted to have a luminance value of zero. Accordingly, those pixels that have a luminance value from 128 to 255 may be adjusted to have a luminance value of 255. In this way, an image may be converted into a binary image consisting of only pixels that are white or black. In some cases, the image analysis technique to quantify the spatial homogeneity of the porosity may be performed on the binary image.

In many cases, the computing device which performs the image analysis is a standalone computing device. The standalone computing device may perform the image analysis offline, that is, separately from the thermal spray system. Results of the image analysis may be used to make determinations about the quality of the layer and/or parameters of the thermal spray system which applied or is applying the layer. However, it is also considered that the computing device which performs the image analysis may be an integrated part of a thermal spray system which includes a thermal spray gun configured to apply a thermally-sprayed coating layer to a substrate and an imaging device. In such cases, the computing device may perform the image analysis and feedback results which may be used to control the thermal spray process. For example, the computing device may control (e.g., adjust) one or more parameters of the thermal spray gun based at least partially on the determined quantification of the spatial homogeneity of the porosity of the layer. In some examples, the computing device may compare the determined spatial homogeneity parameter to a threshold spatial homogeneity parameter, and responsive to determining that the determined spatial homogeneity parameter exceeds the threshold spatial homogeneity parameter, controlling, by the computing device, at least one parameter of a thermal spray gun configured to apply the thermally-sprayed coating. In this way, thermal spray systems may be controlled based on the disclosed image techniques, which may allow for fabrication of parts with increased quality relative to systems which are not controlled based on the spatial distribution of the porosity of the layer.

Figure 1A:
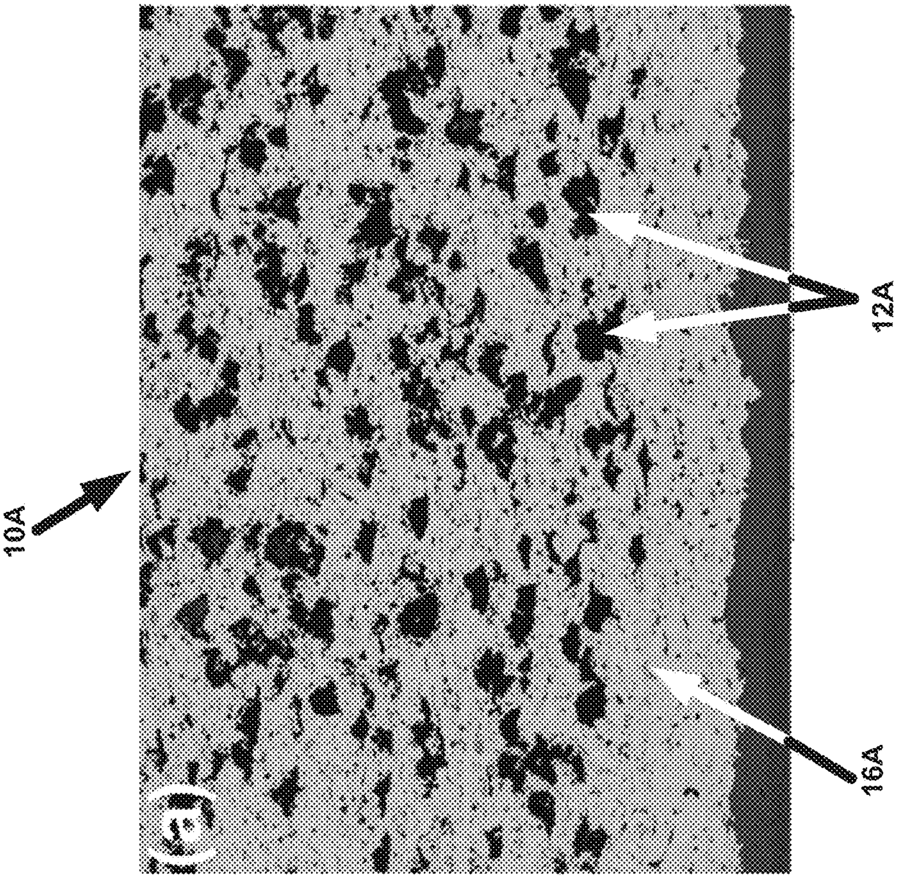

FIGS. 1A and 1B are micrographs illustrating cross-sections of two example thermally-sprayed layers, 10A, and 10B, respectively. Although, primarily described below with respect to layer 10A of FIG. 1A, the description of layer 10A of FIG. 1A also applies to layer 10B of FIG. 1B, except where explicitly described as differing.

FIG. 1A is a conceptual diagram illustrates an image indicative of a cross-section of a thermally-sprayed layer 10A. Layer 10A is applied by a thermal spray system (for example, similar to thermal spray system 100 described with reference to FIG. 2). The thermal spray system may include an imaging device configured to capture the image of FIG. 1A and a computing device configured to analyze the image to determine a porosity of layer 10A. Layer 10A may be a bond coat, a primer coat, a hard coat, a wear-resistant coating, a thermal barrier coating, an environmental barrier coating, an abradable coating layer or the like. As such, layer 10A may be a top or outer coating that is exposed to the environment, or may be an underlayer that is not exposed to the environment and has other coating layer formed on layer 10A. Layer 10A may be formed as part of a high-temperature mechanical system such as a gas turbine engine. In some examples, layer 10A may be in a range of from about 10 micrometers to about 5,000 micrometers in thickness. As such, a cross-sectional image like the one conceptually illustrated in FIG. 1A may be taken under magnification by an imaging device of the thermal spray system.

The thermal spray system may direct a powder with heat and carrier gases at a substrate to form layer 10A. The powder may at least partially melt during flight, and may flatten upon impact and adhere as lamellae 16A. Layer 10A includes pores 12A. Pores 12A are void volumes within layer 10A. Performance and material properties of layer 10A may depend on the relative fraction of lamellae 16A, the relative fraction of pores 12A, and the spatial homogeneity with which pores 12A are distributed, e.g., whether pores 12A are homogenously distributed throughout layer 12A or whether pores 12A are clustered inhomogeneously throughout layer 10A. The total porosity (e.g., volume percentage of void space) of layer 10A may be a useful parameter, and may be considered the sum of the volume of pores 12A and other void volumes (e.g., splat lines). As such, it may be important to measure and quantify these parameters of layer 10A.

One way to measure the porosity of layer 10A is to analyze an image of a cross-section of layer 10A like the image of FIG. 1A. The image of FIG. 1A is a two-dimensional image of a cross-section of layer 10A. The image of FIG. 1A may be generated according to a sampling procedure. The sampling procedure may involve sampling layer 10A, cutting into layer 10A, and capturing an image representative of a cross-section of layer 10A with an imaging device. Sampling may occur on a temporal basis (e.g., every 1 minute of operation of system 10, every 5 minutes, or the like), or on an area basis of layer 10A (e.g., 1 square centimeter of layer 10 may be removed for imaging and analysis from every square meter of layer 10, or the like), or on a job basis (e.g., every third coated part is inspected by image processing techniques to determine a porosity of layer 10A).

The computing device may analyze the two-dimensional image of FIG. 1A to determine a porosity of layer 10A. For example, the received raw image may consist of a matrix of pixels. Each individual pixel in the matrix of pixels may define a luminance value. The computing device may determine, based on the luminance value, that one or more pixels in the matrix of pixels correspond to a void volume in the image. The computing device may determine that the sum of pixels that correspond to void volumes also correspond to the porosity of layer 10A.

By way of example, the received image may be 1024 pixels by 1024 pixels, and thus the raw image may consist of 1,048,576 pixels. The computing device may determine that 104,858 pixels correspond to void volumes. Since 104,858 pixels correspond to voids out of a total of 1,048,576 pixels in the image, the computing device may determine that 10 percent of the pixels in the image correspond to void volumes. In some examples, the computing device may determine that the pixels indicative of void volumes in the image directly correlate to the porosity in layer 10A. Thus, the computing device may determine that layer 10A has a porosity of 10 volume percent, which corresponds to a void fraction of 0.1. Of course, other image matrix sizes and other determined porosities are also considered.

In some examples, the image of FIG. 1A is analyzed to determine a porosity of layer 10A and a determination of the spatial homogeneity of pores 12A. For example, a skilled operator may compare the image to an image with known porosity and acceptable spatial homogeneity of pores 12A to determine the porosity of layer 10A and the spatial homogeneity of layer 10A. In these examples, the skilled operator or the computing device may not precisely estimate the porosity of layer 10A and spatial homogeneity of porosity of layer 10A.

FIG. 1B is a conceptual diagram illustrates an image indicative of a cross-section of a thermally-sprayed layer 10B. Layer 10B may have a similar total porosity to layer 10A of FIG. 1A. However, unlike layer 10A, pores 12B of layer 10B may have a different spatial distribution of pores 12B than pores 12A of layer 10A. As illustrated, pores 12B may be less homogenously distributed than pores 12A of layer 10A. Thus, layer 10B includes reduced-porosity portions 14B. Reduced-porosity portions 14B may include fewer void volumes than other portions of layer 10B. Although a visual comparison of example layers 10A and 10B may allow an operator to determine that the layers have similar porosity levels and that the spatial homogeneity of the porosity of layer 10A is relatively more homogenous than the spatial homogeneity of the porosity of layer 10B, it may be difficult or impossible to quantify the porosity and/or the spatial homogeneity of the porosity of layers 10A, 10B with precision and accuracy.

In one or more examples of the present disclosure, the computing device may more accurately measure and quantify the differences between layers 10A and 10B. For example, image processing techniques disclosed herein may include identifying, by the computing device and based on the luminance values, at least one pixel that is indicative of pores 12A, 12B in layers 10A, 10B. Techniques disclosed herein may also include calculating, by the computing device and based on the at least one pixel that is indicative of pores 12A, 12B, the total porosity of layers 10A, 10B. Techniques disclosed herein may include determining, by the computing device and based on the at least one pixel that corresponds to pores 12A, 12B in layers 10A, 10B, a quantification of a spatial homogeneity of the porosity of layers 10A, 10B. In this way, techniques disclosed herein may allow for relatively accurate quantification of the porosity and spatial homogeneity of porosity of layers 10A, 10B.

Figure 2:
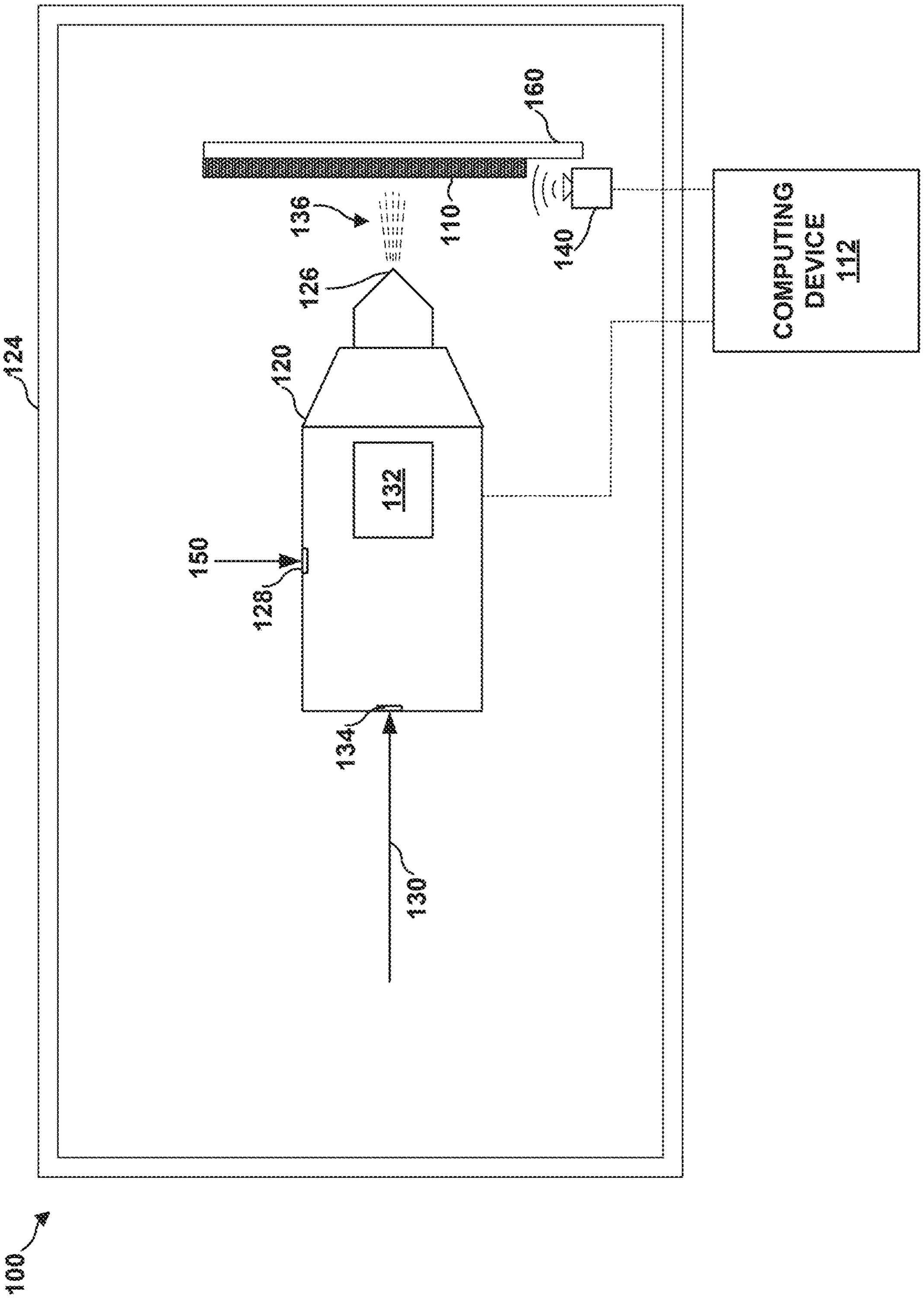
FIG. 2 is a conceptual block diagram illustrating a thermal spray system including an imaging device and a computing device for analyzing a thermally-sprayed layer generated by a thermal spray system, according to one or more examples of the present disclosure.

FIG. 2 is a conceptual block diagram illustrating an example thermal spray system 100 for forming a layer 110. In some examples, thermal spray system 100 includes components such as an enclosure 124, a thermal spray gun 120, imaging device 140, and a computing device 112. System 100 of FIG. 2 may be an example of the thermal spray system used to form layers 10A, 10B of FIGS. 1A and 1B, and thus may be capable of capturing the cross-sectional image of FIGS. 1A and 1B.

Enclosure 124 encloses some components of thermal spray system 100, including, for example, thermal spray gun 120 and imaging device 140. In some examples, enclosure 124 substantially completely surrounds thermal spray gun 120 and imaging device 140 and encloses an atmosphere. The atmosphere may include, for example, air, an inert atmosphere, a vacuum, or the like. In some examples, the atmosphere may be selected based on the type (e.g., composition) of coating being applied using thermal spray system 100. Enclosure 124 also encloses a spray target 160, to which layer 110 is applied.

Spray target 160 includes a substrate to be coated with layer 110 using thermal spray system 100. In some examples, spray target 160 may include a component used in any one or more mechanical systems, including, for example, a high temperature mechanical system such as a gas turbine engine. In such examples, layer 110 may be a bond coat, a primer coat, a hard coat, a wear-resistant coating, a thermal barrier coating, an environmental barrier coating, or the like. Layer 110 may be all or part of a coating system. Spray target 160 may include a substrate or body of any regular or irregular shape, geometry or configuration. In some examples, spray target 160 may include metal, plastic, glass, or the like.

Thermal spray gun 120 is coupled to a gas feed line 130 via gas inlet port 134, is coupled to a spray material feed line 150 via material inlet port 128. Gas feed line 130 provides a gas flow to gas inlet port 134 of thermal spray gun 120. Depending upon the type of thermal spray process being performed, the gas flow may be a carrier gas for the coating material, may be a fuel that is ignited to at least partially melt the coating material, or both. Gas feed line 130 may be coupled to a gas source (not shown) that is external to enclosure 124.

Thermal spray gun 120 also includes a material inlet port 128, which is coupled to spray material feed line 150. Material feed line 150 may be coupled to a material source (not shown) that is located external to enclosure 124. Coating material may be fed through material feed line 150 in powder form, and may mix with gas from gas feed line 130 within thermal spray gun 120. The composition of the coating material may be based upon the composition of the coating to be deposited on spray target 160, and may include, for example, a metal, an alloy, a ceramic, combinations thereof, or the like. The composition of coating material may include additives configure to impart properties to layer 110. Such additives may include fugitive materials intended to volatilize to impart porosity to layer 110.

Thermal spray gun 120 also includes energy source 132. Energy source 132 provides energy to at least partially melt the coating material from coating material provided through material inlet port 128. In some examples, energy source 132 includes a plasma electrode, which may energize gas provided through gas feed line 130 to form a plasma. In other examples, energy source 132 includes an electrode that ignites gas provided through gas feed line 130.

As shown in FIG. 2, an exit flowstream 136 exits outlet 126 of thermal spray gun 120. In some examples, outlet 126 includes a spray gun nozzle. Exit flowstream 136 may include at least partially melted coating material carried by a carrier gas. Outlet 126 may be configured and positioned to direct the at least partially melted coating material at spray target 160.

Thermal spray system 100 includes at least one imaging device 140. Imaging device 140 is configured to capture image data representative of a cross-section of layer 110. In some examples, imaging device 140 may include a scanning electron microscope (SEM) or a visual camera with optical microscopy equipment. As such, imaging device 140 may include optical equipment (lenses, mirrors, or the like) configured to capture the image as a micrograph. The imaging device may further include illumination equipment configured to illuminate layer 110 to capture the image data at a plurality of different luminance values. Imaging device 140 may be configured to capture, store, and/or transmit the image data as an image including a matrix of pixels. Each pixel in the matrix of pixels may define at least one luminance value. The luminance value may be indicative of the image intensity or brightness.

In some examples, the image may be a black and white image. Put differently, the image may not include colors other than black and white. In such examples, each pixel in the matrix of pixels may define a single luminance value. In some cases, the luminance value may be in a range from 0 to 255, where 0 corresponds to a black color, 255 corresponds to a white color, and the intervening numbers correspond to shades of gray between black and white. Generally, images captured through SEM may be black and white images.

Additionally, or alternatively, imaging device 140 may capture the image as a color image. Generally, images captured through optical microscopy may be color images. A color image may include colors other than black and white. In some color images, each pixel in the matrix of pixels may define a luminance value for each of a red color, a blue color, and a yellow color. The luminance values for each of red, green, and yellow may be scaled similarly to those described above. Alternative or additional color matrices are also considered.

Computing device 112 may be configured to control operation of one or more components of thermal spray system 100 automatically or under control of a user. For example, computing device 112 may be configured to control operation of thermal spray gun 120, gas feed line 130 (and the source of gas-to-gas feed line 130), material feed line 150 (and the source of material-to-material feed line 150), at least one imaging device 140, and the like. Computing device 112 also may be configured to receive at least one image of a cross-section of layer 110 (e.g., similar to as shown in FIG. 1) from at least one imaging device 140 and analyze and/or process the at least one image to determine a porosity and/or other characteristics of layer 110. The determined porosity, determined spatial homogeneity of the porosity, and/or other characteristics of layer 110 may be used to determine and/or control one or more process attributes of thermal spray system 100.

During a thermal spray process, thermal spray system 100 performs at least one process, such as depositing layer 110 on spray target 160. Thermal spray system 100 and the thermal spray process performed by thermal spray system 100 possess a plurality of process attributes. In some examples, computing device 112 may store a desired target porosity for layer 110 and may store a desired target spatial homogeneity of the porosity. The desired target porosity may be within a predetermined target porosity range (e.g., a bounded range, such as from 8 volume percent to 12 volume percent. Similarly, computing device 112 may store a threshold spatial homogeneity parameter. Computing device 112 may compare the determined spatial homogeneity parameter to a threshold spatial homogeneity parameter. responsive to determining that the determined spatial homogeneity parameter exceeds the threshold spatial homogeneity parameter, computing device 112 may execute one or more actions. For example, computing device 112 may add a tag to the image which is indicative of the need for further inspection of layer 110 represented in the image. Further inspection may result in rework or discarding of spray target 160. Alternatively, or additionally to tagging the image, computing device 112 may stop deposition of layer 110 for inspection of system 100. Parameters of thermal spray gun 120 that are controlled and may be adjusted by computing device 112 may include process parameters such as at least one of a temperature, a pressure, a mass flow rate, a volumetric flow rate, a molecular flow rate, a molar flow rate, a composition or a concentration, of a flowstream flowing through thermal spray system 100, for instance, of gas flowing through gas feed line 130, or of exit flowstream 136, or of material flowing through material feed line 150.

Figure 3:
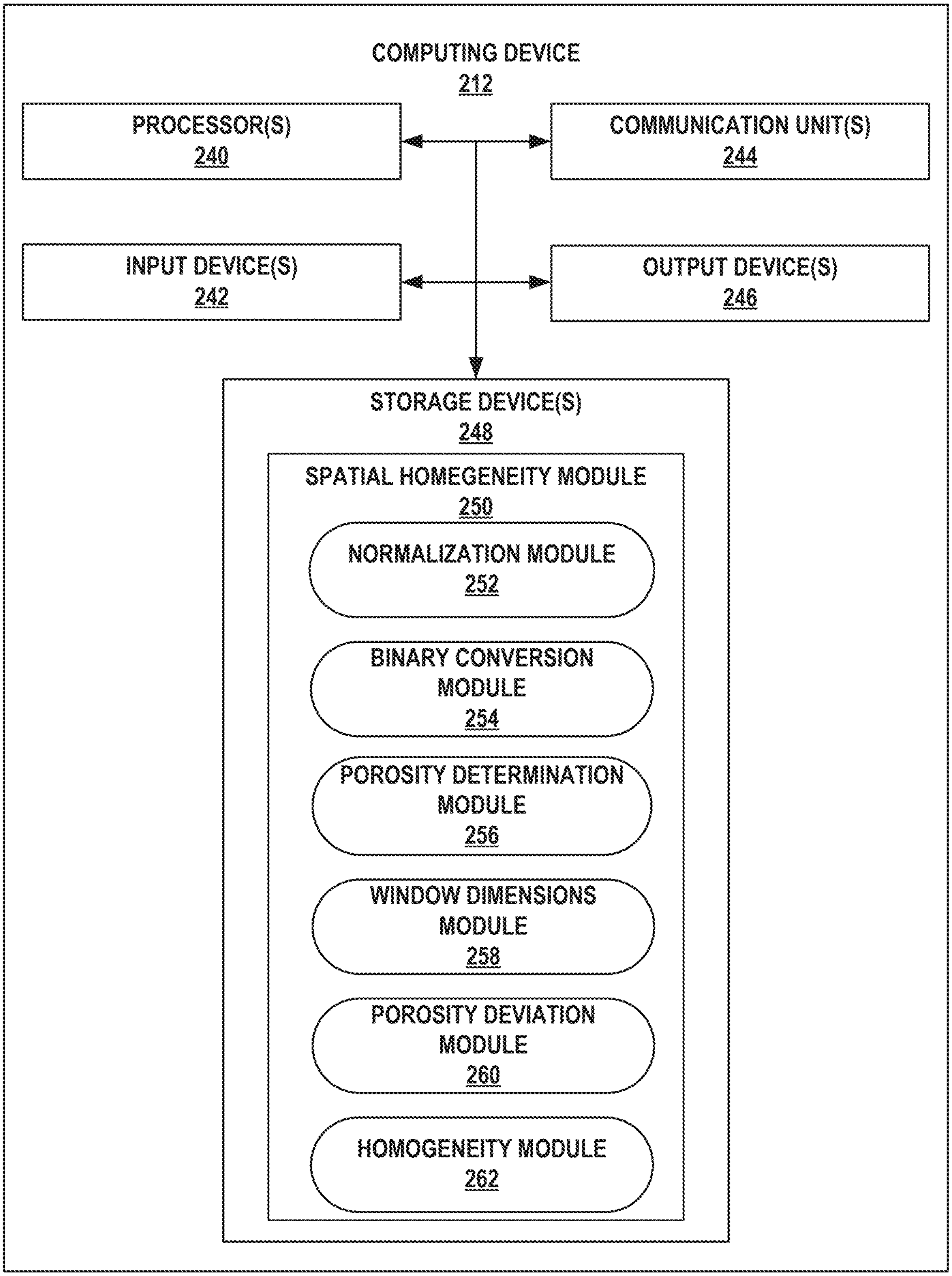
FIG. 3 is a conceptual illustration of a computing device for analyzing an image representative of a thermally-sprayed layer, according to one or more examples of the present disclosure.

FIG. 3 is a conceptual block diagram illustrating an example of a computing device 212. Computing device 212 of FIG. 3 may be an example of computing device 112 of FIG. 2. In some examples, computing device 212 may include, for example, a desktop computer, a laptop computer, a workstation, a server, a mainframe, a cloud computing system, or the like. In some examples, computing device 212 may control the operation of system 100 of FIG. 2, including, for example, thermal spray gun 120, energy source 132, entry flowstream 130, exit flowstream 136, imaging device 140, spray material feed 150, and spray target 160. In other examples, computing device 212 may be separate from the rest of a thermal spray system, and may be configured only to process a captured image of a coating layer such as layer 10A or 10B of FIG. 1 or layer 110 of FIG. 2.

In the example illustrated in FIG. 3, computing device 212 includes one or more processors 240, one or more input devices 242, one or more communication units 244, one or more output devices 246, and one or more storage devices 248. In some examples, one or more storage devices 248 stores spatial homogeneity module 250. In other examples, computing device 212 may include additional components or fewer components than those illustrated in FIG. 2.

One or more processors 240 are configured to implement functionality and/or process instructions for execution within computing device 212. For example, processors 240 may be capable of processing instructions stored by storage device 248. Examples of one or more processors 240 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 248 may be configured to store information within computing device 212 during operation. Storage devices 248, in some examples, include a computer-readable storage medium or computer-readable storage device. In some examples, storage devices 248 include a temporary memory, meaning that a primary purpose of storage device 248 is not long-term storage. Storage devices 248, in some examples, include a volatile memory, meaning that storage device 248 does not maintain stored contents when power is not provided to storage device 248. Examples of volatile memories include random access memories (RAM), dynamic random access memories (DRAM), static random access memories (SRAM), and other forms of volatile memories known in the art. In some examples, storage devices 248 are used to store program instructions for execution by processors 240. Storage devices 248, in some examples, are used by software or applications running on computing device 212 to temporarily store information during program execution.

In some examples, storage devices 248 may further include one or more storage device 248 configured for longer-term storage of information. In some examples, storage devices 248 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 212 further includes one or more communication units 244. Computing device 212 may utilize communication units 244 to communicate with external devices (e.g., thermal spray gun 120, entry flowstream 130, exit flowstream 136, acoustic sensor 140, spray material 150, and spray target 160) via one or more networks, such as one or more wired or wireless networks. Communication unit 244 may include a network interface card, such as an Ethernet card, an optical transceiver, a radio frequency transceiver, or any other type of device that can send and receive information. Other examples of such network interfaces may include Wi-Fi radios or Universal Serial Bus (USB). In some examples, computing device 212 utilizes communication units 244 to wirelessly communicate with an external device such as a server.

Computing device 212 also includes one or more input devices 242. Input devices 242, in some examples, are configured to receive input from a user through tactile, audio, or video sources. Examples of input devices 242 include a mouse, a keyboard, a voice responsive system, video camera, microphone, touchscreen, or any other type of device for detecting a command from a user.

Computing device 212 may further include one or more output devices 246. Output devices 246, in some examples, are configured to provide output to a user using audio or video media. For example, output devices 246 may include a display, a sound card, a video graphics adapter card, or any other type of device for converting a signal into an appropriate form understandable to humans or machines. In some example, computing device 212 outputs a representation of the image data captured by imaging device 140.

In some examples, computing device 212 may generate an alert in response to a determination of a state of system 100 or layer 110, via output devices 246. For example, computing device 212 may generate auditory signals, such as a beep, an alert tone, or an alerting sound, or visual signals, such as an icon on a display, flashing lights, or a combination of visual and audible signals, to indicate a process variance or a process parameter deviation. For example, the alert may be generated in response to a determination by computing device 212 that layer 110 defines a spatial homogeneity of porosity that exceeds a threshold, where a higher number indicates a less homogenous distribution of porosity. In some examples, an operator may thus be alerted, and may choose to investigate thermal spray system 100. As another example, computing device 212 may generate an alert that is transmitted over a network to another computing device, including a hand-held computing device, for instance, a cellphone. The alert signal may include information about a parameter of layer 110 parameter or a process parameter.

Storage devices 248 of computing device 212 may include spatial homogeneity module 250. In some examples, spatial homogeneity module 250 processes the image or images captured by imaging device 140 to determine the spatial distribution of porosity of layer 110, and may output a quantification of the spatial homogeneity of the porosity. Spatial homogeneity module 250 may determine a total porosity of coating layer 110, and may provide more granular information about layer 110 including a porosity. To determine these characteristics of coating layer 124, spatial homogeneity module 250 may include sub-modules configured to execute specific functions on the received image. Functions performed by normalization module 252, binary module 254, porosity determination module 256, window dimensions module 258, porosity deviation module 260, and homogeneity module 262 are explained below with reference to the example flow diagram illustrated in FIG. 4.

Spatial homogeneity module 250 and its sub-modules normalization module 252, binary conversion module 254, porosity determination module 256, window dimensions module 258, porosity deviation module 260, and homogeneity module 262 may be implemented in various ways. For example, normalization module 252, binary conversion module 254, porosity determination module 256, window dimensions module 258, porosity deviation module 260, and homogeneity module 262 may be implemented as software, such as an executable application or an operating system, or firmware executed by one or more processors 240. In other examples, normalization module 252, binary conversion module 254, porosity determination module 256, window dimensions module 258, porosity deviation module 260, and homogeneity module 262 may be implemented as part of a hardware unit of computing device 212.

Computing device 212 may include additional components that, for clarity, are not shown in FIG. 3. For example, computing device 212 may include a power supply to provide power to the components of computing device 212. Similarly, the components of computing device 212 shown in FIG. 3 may not be necessary in every example of computing device 212.

Figure 4:
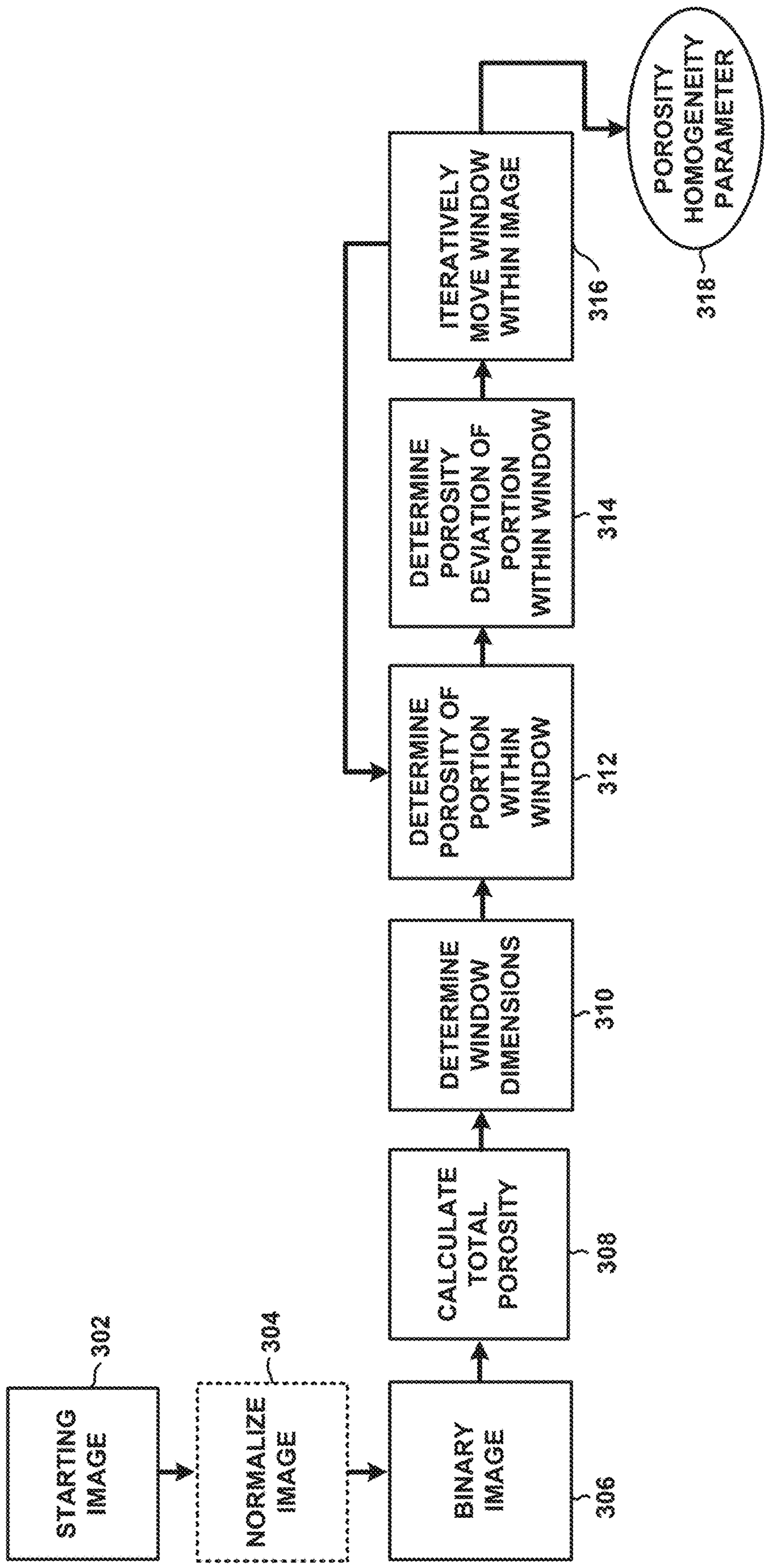
FIG. 4 is a flow diagram illustrating a technique for determining a porosity of a thermal-sprayed coating, according to one or more examples of the present disclosure.

Examples of layer 10, thermal spray system 100, and computing device 212 are described with reference to FIGS. 1-3 above. The technique of FIG. 4 is described with reference to an example image of layer 10 of FIG. 1 and system 100 of FIG. 2 as processed by computing device 212 of FIG. 3, and FIGS. 5A-6D representing processing steps.

Computing device 212 may receive the image of FIG. 1A (302). The image of FIG. 1A may be the raw image captured by imaging device 140, and may be representative of a cross-section of layer 110 deposited by thermal spray system 100. The received image may include a matrix of pixels, with each pixel in the matrix having a luminance value.

Normalization module 252 may optionally normalize the image of FIG. 1A (304), resulting in a grayscale image (306). Although the image if FIG. 1A does not include colors other than black and white, in some examples the image of FIG. 1A may include colors other than black and white. Each pixel in the matrix of pixels may define a luminance value. The luminance value may be the brightness intensity. In some examples, the brightness intensity may range from a luminance value of zero to indicate a black color to a luminance value of, for example, 255 to indicate a white color. Other scales of luminance values are also considered. Further, other examples are also considered, such as where the maximum luminance value is indicative of a black color and the minimum luminance value is indicative of a white color. In examples where the image of FIG. 1A is a color image, each pixel in the matrix of pixels may include a luminance value for each of a red color, a yellow color, and a blue color. In such examples, normalization module 252 may remove the color and assign an overall luminance value to the pixel on black and white scale. Normalization module 252 may determine an overall luminance value for each pixel by, for example, summing or averaging the luminance values for each of the red color, the yellow color, and the blue color.

Normalization module 252 may normalize the image of FIG. 1A to generate the grayscale image. The grayscale image may have reduced brightness gradients that may result from the way the image is captured or other artificial means. For example, a camera flash may cause a central portion of the image to appear brighter than the perimeter of the image, and normalizing the image may correct for the camera flash. In some examples, normalizing the image may include adjusting, by normalization module 252, the luminance value of at least one pixel of the matrix of pixels. For example, adjusting the luminance value of at least one pixel may include determining a background luminance value for each individual pixel in the matrix of pixels, and subtracting the background luminance value from each individual pixel luminance value to create the grayscale image. The resulting grayscale image may result in a more accurate representation of layer 10 in the image relative to techniques which do not employ normalization module 252, because the grayscale image may correct for non-uniform illumination of the cross-section of layer 10 by reducing or eliminating brightness gradients. Normalization module 252 may generate the grayscale image by normalizing and/or removing color from the raw image. Spatial homogeneity module 250 may execute normalization module 252 to generate the grayscale image prior to identifying at least one pixel indicative of pores 12A in layer 10A. Thus, further analysis of the image may be performed on an image that is relatively free of noise introduced through non-uniform illumination.

Spatial homogeneity module 250 may execute binary conversion module 254 to generate a binary image (306). In some examples, binary conversion module 254 may assign each pixel in the matrix of pixels in the image to a luminance value that is equal to a luminance value of a black color or a luminance value that is equal to a white color. By way of example, if the scale of luminance values ranges from zero to 255, those pixels that have a luminance value from zero to 127 may be adjusted to have a luminance value of zero by binary conversion module 256. Accordingly, those pixels that have a luminance value from 128 to 255 may be adjusted to have a luminance value of 255. In this way, binary conversion module 254 may convert the received image of FIG. 1A into a binary image consisting of only pixels that are white or black. In some examples, Spatial homogeneity module 250 may execute binary conversion module 254 to generate the binary image prior to identifying at least one pixel indicative of pores 12A in layer 10A. In this way, the received image of FIG. 1A may be converted into an image with each pixel clearly indicative of metal, alloy, or ceramic components of layer 10A or pores 12A.

Spatial homogeneity module 250 may execute porosity determination module 256 to calculate a total porosity of layer 10A (308). Porosity determination module 256 may identify, based on a respective luminance value of each pixel in the matrix of pixels making up the image, at least one pixel that is indicative of pores 12A in layer 10A. For example, if the optional conversion to a binary image has been generated by binary conversion module 254, porosity determination module 256 may determine that pixels with a luminance value equal to a black color are indicative of pores 12A, or that pixels with a luminance value that is equal to a white color is indicative of pores 12A. In examples where binary conversion module 254 has not been executed, and where the scale of luminance values ranges from zero to 255, porosity determination module 256 may identify those pixels that have a luminance value from zero to as indicative of pores 12A. Porosity determination module may calculate a total porosity of layer 10A by summing the at least one pixel that is indicative of the void volume within layer 10A and comparing to the total number of pixels in the matrix of pixels. For example, porosity determination module 256 may divide the number of pixels indicative of pores 12A by the total number of pixels in the matrix of pixels.

The technique of FIG. 4 may include executing window dimensions module 258 to form an analysis window in the image of FIG. 10A (310). The analysis window may include (e.g., surround) a set of pixels indicative of a portion of layer 10A in the image of FIG. 1A. As such, the analysis window may include a portion of the pixels in the analysis window. In some examples, to form the analysis window, window dimensions module 258 may determine a dimensional term by determining the inverse of the total porosity. Window dimensions module 258 may determine, in pixels, a width and a height of the matrix of pixels making up the image. Window dimensions module 258 may set the dimensions of the analysis window by dividing each of the width and the height of the matrix of pixels by the dimensional term.

The technique of FIG. 4 further includes determining, via porosity deviation module 260, a regional porosity of the portion of the layer in the analysis window (312). Porosity deviation module 260 may identify at least one pixel in the analysis window that is indicative of pores 12A. In some examples, to determine the regional porosity, porosity deviation module 260 may sum the at least one pixel indicative of pores 12A within the analysis window and comparing to a total number of pixels in the analysis window. For example, the number of pixels indicative of pores 12A may be divided by the total number of pixels in the analysis window to determine the regional porosity.

Porosity deviation module 260 may compare the regional porosity (e.g., the porosity of the portion of layer 10A in the analysis window, to the total porosity, which may allow for determining the spatial homogeneity of the porosity of layer 10A. For example, examples where the regional porosity differs significantly from the total porosity of the image may be indicative of a spatially inhomogeneous layer 10B. With reference to FIG. 1B, in such a case the analysis window may include one or more reduced-porosity portion 14B. Since reduced-porosity portion 14B includes fewer pores 12B than other portions of layer 10B, the regional porosity of a portion of layer 10B in an analysis window which includes one or more reduced-porosity portions 14B may differ significantly from the total porosity of layer 10B. Turning back to FIG. 1A, in some examples, porosity deviation module 260 may determine a porosity deviation parameter of the portion of layer 10A within the analysis window (314). The determined porosity deviation parameter maybe equal to the absolute value of a difference between the regional porosity, expressed as a void fraction, and the total porosity of layer 10A, expressed as a void fraction, multiplied by the dimensional term determined in step 310. As such, the porosity deviation parameter may be a normalize value ranging from zero to one that describes the percentage deviation form the total porosity for a given subsection.

Next, porosity deviation module 260 may iteratively move the analysis window within the image of FIG. 1A (316). In this way, the regional porosity of some or all of the different portions of layer 10A may be analyzed. In some examples, the analysis window may be positioned at a first location within the image of FIG. 1A, and porosity deviation module may move the analysis window to a second location within the image. The second location may include a set of pixels indicative a different portion of layer 10A in the image. A location may be considered different where at least one pixel in the first set of pixels of the analysis window in the first location is not included in the second set of pixels of the analysis window in the second location. Porosity deviation module 260 may determine a regional porosity of the portion of layer 10A in the analysis window in the second location, and may determine a porosity deviation parameter of the portion of layer 10A in the analysis window in the second location. In some examples, porosity deviation module 260 may move the analysis window to a third location within the image, wherein the third location includes a set of pixels indicative of a different portion of layer 10A than the analysis window of the second location, and may determine the porosity deviation parameter of the portion of layer 10A in the analysis window in the third location.

As indicated by the looping arrow in FIG. 4, steps 312, 314, and 316 may be repeated, such that porosity deviation module 260 may iteratively move the analysis window a plurality of times to a plurality of locations and determine the porosity deviation parameter of the portion of layer 10A in the analysis window in each respective location of the plurality of locations. In some examples, the plurality of locations may number at least 1,000 locations, such as at least 10,000 locations. It may be desirable to iteratively move the analysis window to a plurality of locations within the image to analyze any potential clusters of pores 12A and/or reduced-porosity portions of layer 10A. In some examples, porosity deviation module may randomly move the analysis window in at least one direction with reference to the first or a previous location of the analysis window.

The technique of FIG. 4 further includes determining, via homogeneity module 262, a spatial homogeneity parameter (318). In some examples, the spatial homogeneity parameter may be a quantification of the spatial homogeneity with which pores 12A are distributed in layer 10A. In some examples, to determine the spatial homogeneity parameter, homogeneity module 262 may determine a range of determined porosity deviation parameters. Homogeneity module 262 may plot each determined porosity deviation parameter to deter the range of porosity deviation parameters. Homogeneity module 262 may set the spatial homogeneity parameter equal to the determined range of determined porosity deviation parameters. The determined spatial homogeneity parameter may serve as a single number which is indicative of the spatial homogeneity of the distribution of pores 12A in layer 10A. The spatial homogeneity parameter may span a range from zero to one. A spatial homogeneity parameter of zero may indicate a layer that is fully homogeneous, and a spatial homogeneity parameter of one may indicate a layer that is fully heterogeneous. As such, layer 10A of FIG. 1A may have a lower spatial homogeneity parameter than layer 10B of FIG. 1B, because the pores are less homogeneously distributed in layer 10B.

Figure 5A:
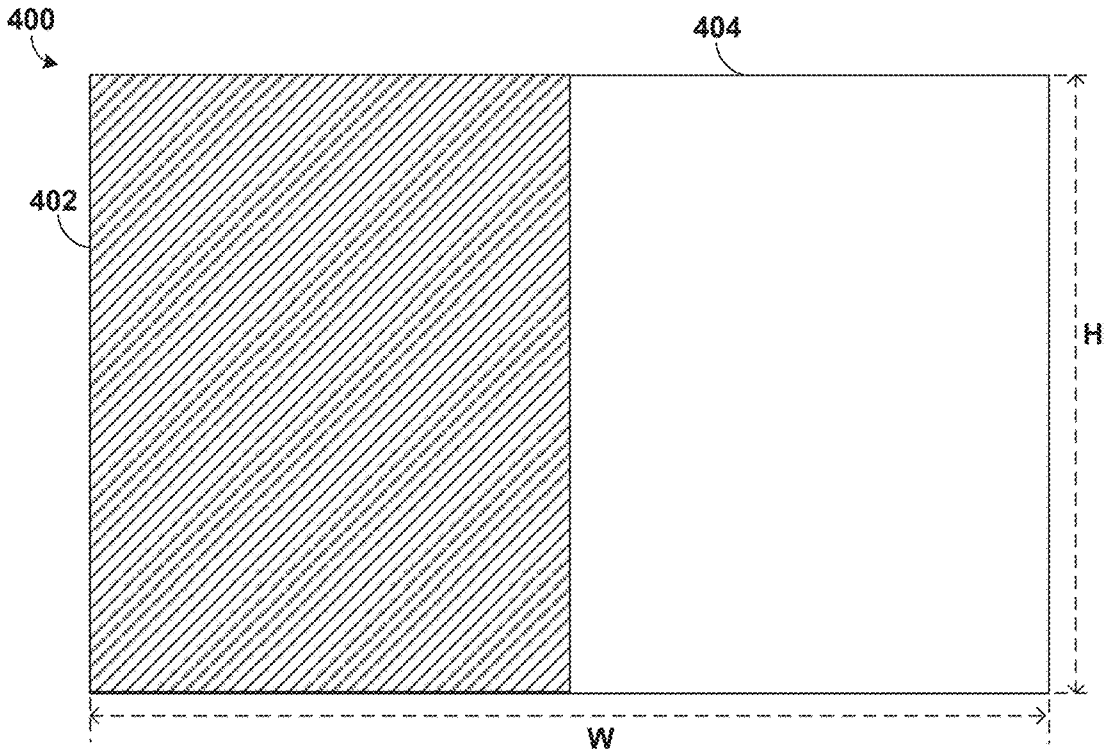
FIGS. 5A-5D are conceptual and schematic diagrams illustrating a technique for determining a spatial homogeneity parameter of a first example binary image, according to one or more examples of the present disclosure.
Figure 5B:
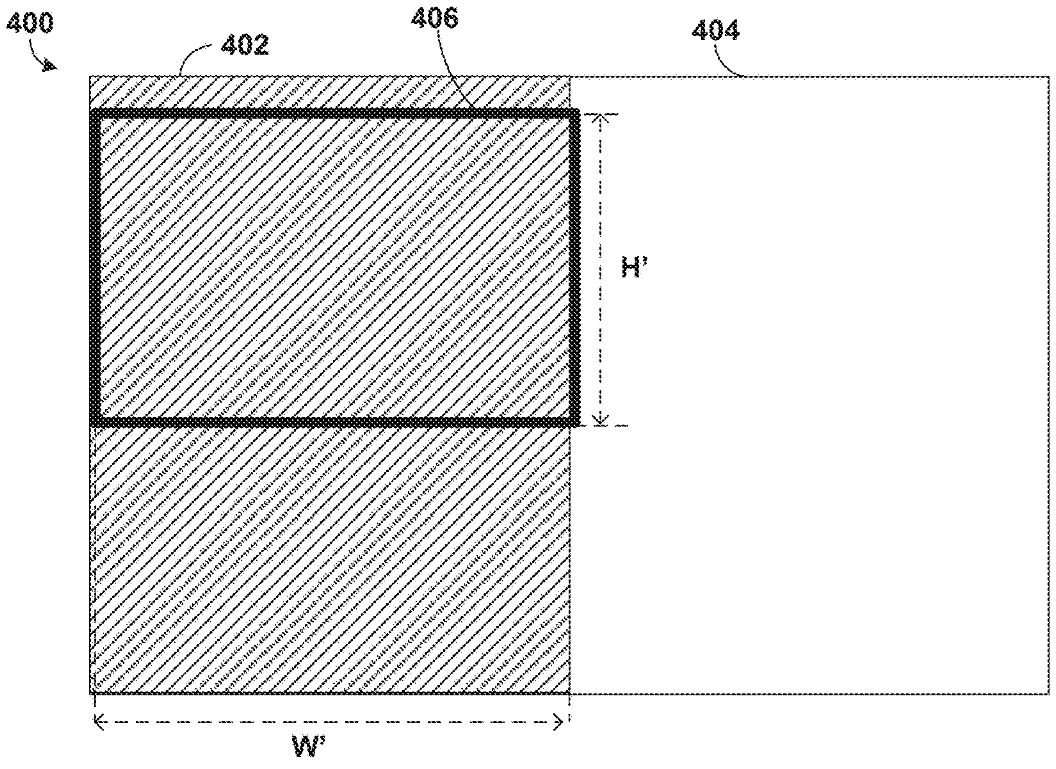
Figure 5C:
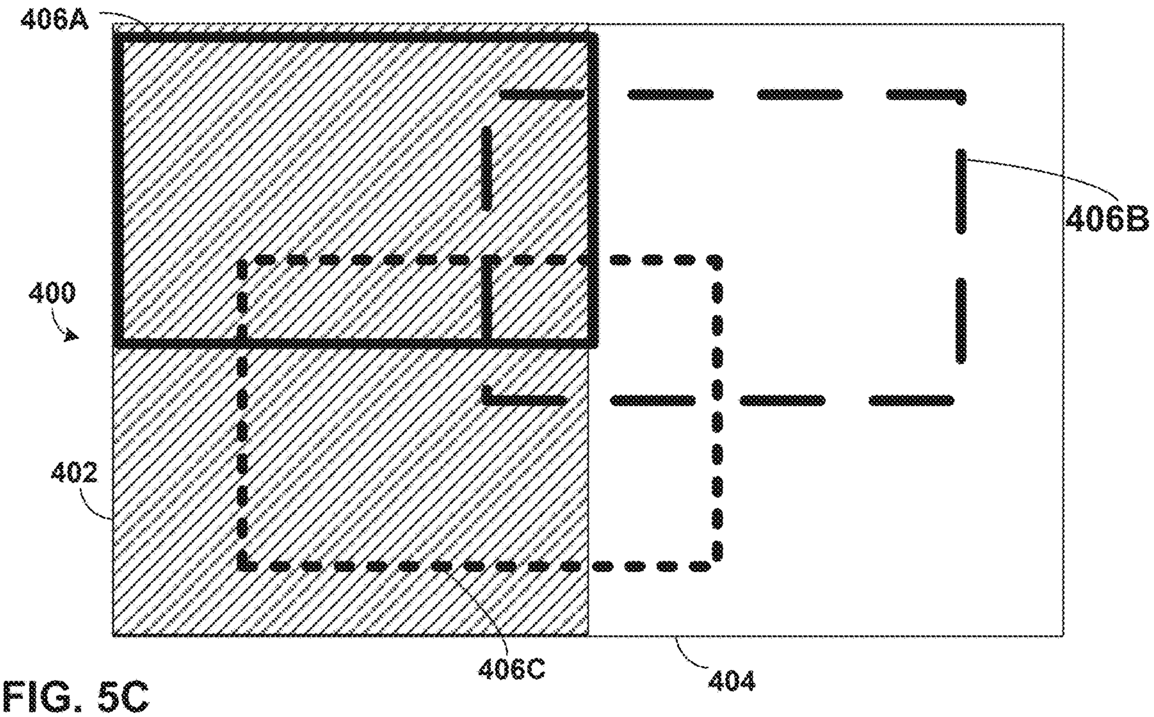

FIGS. 5A-5D are conceptual and schematic diagrams illustrating a technique for determining a spatial homogeneity parameter of a first example binary image. FIGS. 6A-6D are conceptual diagrams illustrating the technique of FIGS. 5A.-5D employed to determine a spatial homogeneity parameter technique of a second example binary image. FIG. 5A-5C are conceptual diagrams illustrating the technique of FIG. 4 performed on an example image 400. Image 400 of FIGS. 5A-5C is a binary image made up of a matrix of pixels. Each pixel defines a luminance value. Black pixels 402 define a luminance value indicative of a black color, and white pixels 404 define a luminance value indicative of a white color. Image 400 is made up of a matrix of pixels W pixels wide by H pixels high. Image 400 is illustrated on an example image that is inhomogeneous, that is, all of black pixels 402 are on the left half of image 400 while all of white pixels 404 are on the right half of image 400. Image 400 is chosen to illustrate the disclosed image processing technique more clearly. Typically, an image of as layer 10A such as FIG. 1A will not include such a perfectly inhomogeneous distribution of pores 12A to lamellae 16A. However, image processing techniques of the present disclosure, which is illustrated with respect to a simplified perfectly inhomogeneous layer of image 400, may be performed on layer 10A of FIG. 1A and other layers.

With reference to FIG. 5A, computing device 212 may receive image 400 and may execute an image analysis technique to determine a quantification of a spatial homogeneity of the porosity of the image. In image 400, black pixels 402 may be understood as being indicative of void volumes (e.g., pores 12A of FIG. 1A) while white pixels 404 may be understood as being indicative of ceramic, metallic, or alloy components of a layer (e.g., lamellae 16A of FIG. 1A). Porosity determination module 256 may identify, based on the luminance values of black pixels 402 and white pixels 404, black pixels 402 as being indicative of void volumes in a layer that image 400 represents. Porosity determination module 256 may calculate that the total porosity of the total porosity of the layer in image 400 is 0.5 as a void fraction. To calculate the total porosity, porosity determination module may sum the number of black pixels 402, the divide the number of black pixels 402 by the total number of pixels in image 400 (e.g., black pixels 402 plus white pixels 404).

With reference to FIG. 5B, window dimensions module 258 may form analysis window 406 in image 400. As illustrated, analysis window may include a set of pixels representative of a portion of image 400. Analysis window 406 may surround the pixels included in the analysis window. Dimensions of analysis window 406 may be based on the dimensions of image 400 and/or the total porosity of the layer in image 400. For example, window dimensions module 258 may determine a dimensional term by determining the inverse of the total porosity, which may be 1/0.5, or 2 in this case. Window dimensions module 258 may determine, in pixels, width W and height H of the matrix of pixels making up image 400. Window dimensions module 258 may set the dimensions of analysis window 406 by dividing width W and height H of the matrix of pixels in image 400 by the dimensional term. Since the dimensional term is 2 in the illustrated example, window dimensions module 258 may set window dimensions W' and H', where W' is equal to W/2 and H' is equal to H/2. Window dimensions module may form analysis window 406 with dimensions W' and H', and may locate analysis window 406 in a first location within image 400. The first location may be randomly assigned, or may be assigned to a particular location within image 400 (e.g., the top left corner, or the like).

Porosity deviation module 260 may determine the regional porosity of the portion of image 400 within analysis window 406. Since analysis window 406 includes only black pixels 402, porosity deviation module 260 may the determine that analysis window 406 has a regional porosity of 100%. Put differently, porosity deviation module 260 may conclude that the void fraction of the portion of the layer in window 406 is 1.0. Porosity deviation module may further determine a porosity deviation measure to compare the regional porosity (e.g., the porosity of the layer within window 406) to the total porosity (e.g., the porosity of the layer of image 400). The porosity deviation parameter may be the absolute value of the difference between the regional porosity, expressed as a void fraction, and the total porosity, expressed as a void fraction, multiplied by the dimensional term. Accordingly, porosity determination module 260 may determine that the absolute value of the difference between the regional porosity of 1.0 and the total porosity of 0.5 is 0.5, and multiply by the dimensional term to find a porosity deviation parameter of 1.0.

With reference to FIG. 5C, porosity deviation module 260 may iteratively move the analysis window from first location 406A, to second location 406B, third location 406C, and so on through a plurality of locations, and may determine a respective porosity deviation parameter at each respective location of the plurality of locations. In some examples, to move between from one location to the next, porosity deviation module 260 may move analysis window 406 randomly in at least one direction with respect to an immediately prior location. In some examples, as illustrated, at analysis window 406B at the second location may at least partially overlap analysis window 406A at the first location. In some examples, the analysis window at any two immediately subsequent locations may include at least one different pixel. In some examples, porosity deviation module 260 may iteratively move analysis window 406 to at least 1,000 locations, and may determine a porosity deviation parameter at each respective location of the at least 1,000 locations. In some examples, porosity deviation module 260 may iteratively move analysis window 406 to at least 10,000 locations, and may determine a porosity deviation parameter at each respective location of the at least 10,000 locations.

Figure 5D:
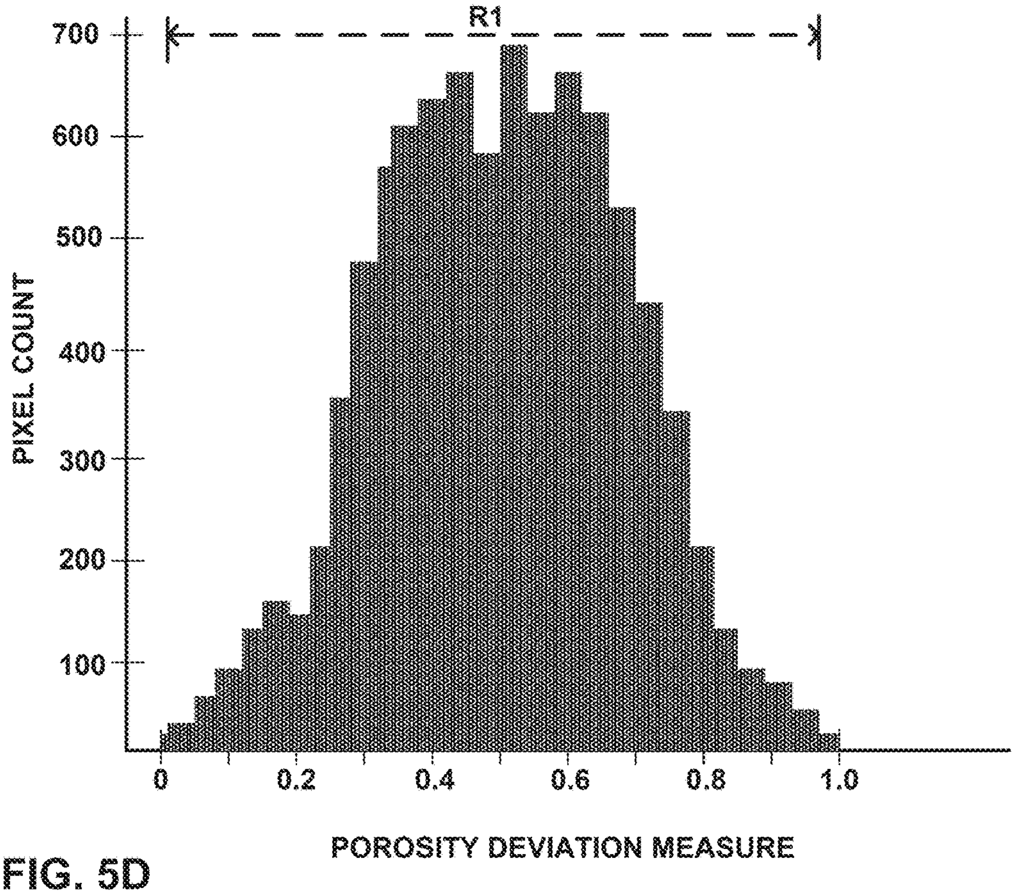

With reference to FIG. 5D, homogeneity module 262 may determine a quantification of the spatial homogeneity of the porosity of a layer represented by image 400. In some examples, the quantification of the spatial homogeneity of the porosity may be based at least partially on the plurality of porosity deviation parameters generated for analysis window 406 in each location within image 400. For example, homogeneity module 262 may generate a spatial homogeneity parameter as the quantification of the spatial homogeneity of the porosity of the layer represented by image 400. In some examples, homogeneity module 262 may plot the determined porosity deviation parameters as a frequency chart, as illustrated. Homogeneity module 262 may determine a range R1 of determined porosity deviation parameters. Homogeneity module 262 may set the spatial homogeneity parameter as R1, the determined range of porosity deviation parameters. Since image 400 is perfectly inhomogeneous, as described above, the range of determined porosity deviation parameters may range all or nearly all of the way from zero to one. Thus, homogeneity module 262 may determine spatial homogeneity parameter is about 1.0. About, as used herein, may mean the stated value plus or minus 10 percent.

FIGS. 6A-6D illustrate the image analysis technique performed on FIGS. 5A-5D executed on another example image 500. Image 500 is a conceptual image similar to image 400 of FIGS. 5A-5D, except black pixels 502 and white pixels 504 are more homogeneously distributed throughout image 500 relative to example image 400. Image 500 includes 50% black pixels 502, which may be indicative of a layer with void fraction of 0.5, similar to image 400.

Figure 6A:
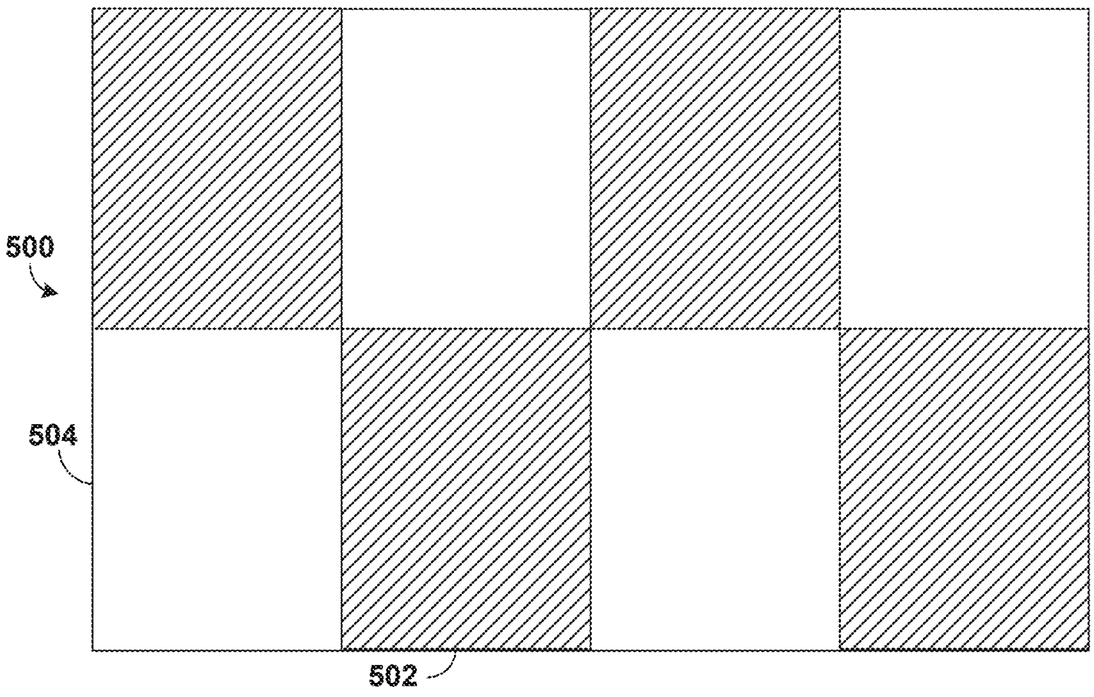
FIGS. 6A-6D are conceptual diagrams illustrating the technique of FIGS. 5A.-5D employed to determine a spatial homogeneity parameter technique of a second example binary image.
Figure 6B:
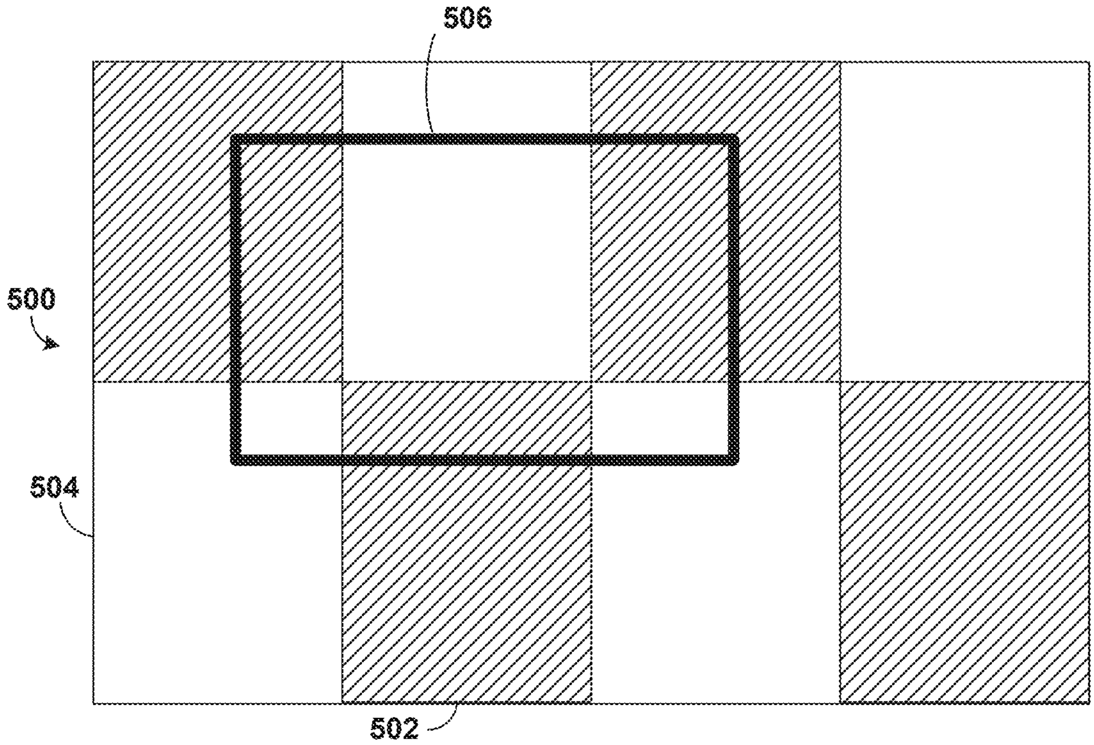
Figure 6C:
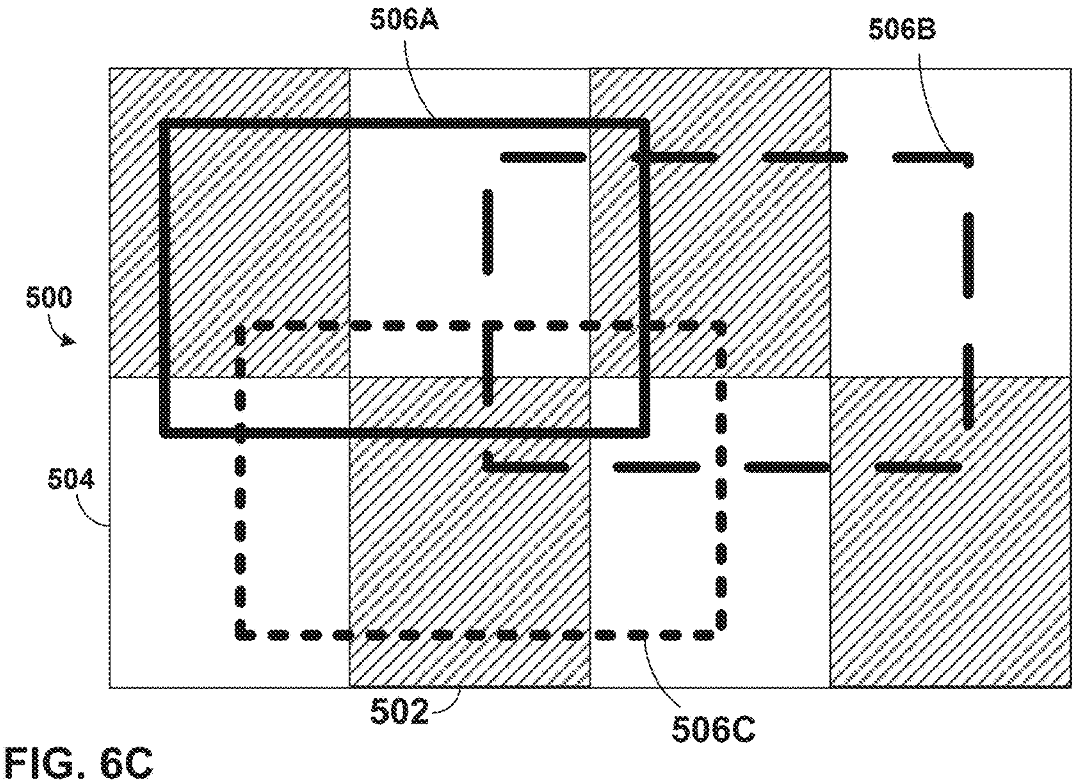

Computing device 212 may receive image 500 and execute spatial homogeneity module 250 and submodules porosity determination module 256, window dimensions module 258, porosity deviation module 260, and homogeneity module 262 as described above with respect to FIGS. 5A-5D. Spatial homogeneity module 250 may form analysis window 506, as illustrated in FIG. 6B. Spatial homogeneity module 250 may further determine porosity deviation parameter at first analysis window location 506A, second analysis window location 506B, third analysis window location 506C, and one or more optional locations. Spatial homogeneity module 250 may further determine spatial homogeneity parameter R2 as the range of determined porosity determination parameters at each location of analysis window 506.

Figure 6D:
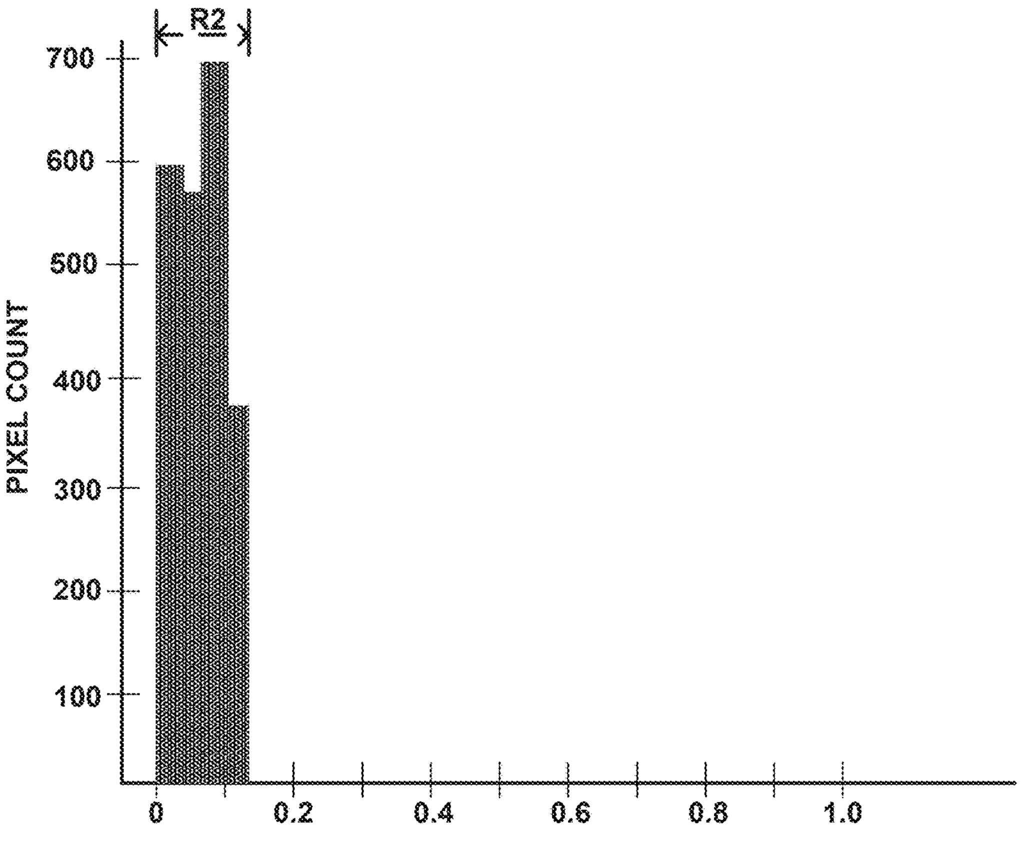
Figures 7A, 7B, 7C, 7D, 7E, 8A, 8B, 8C, 8D, 8E:
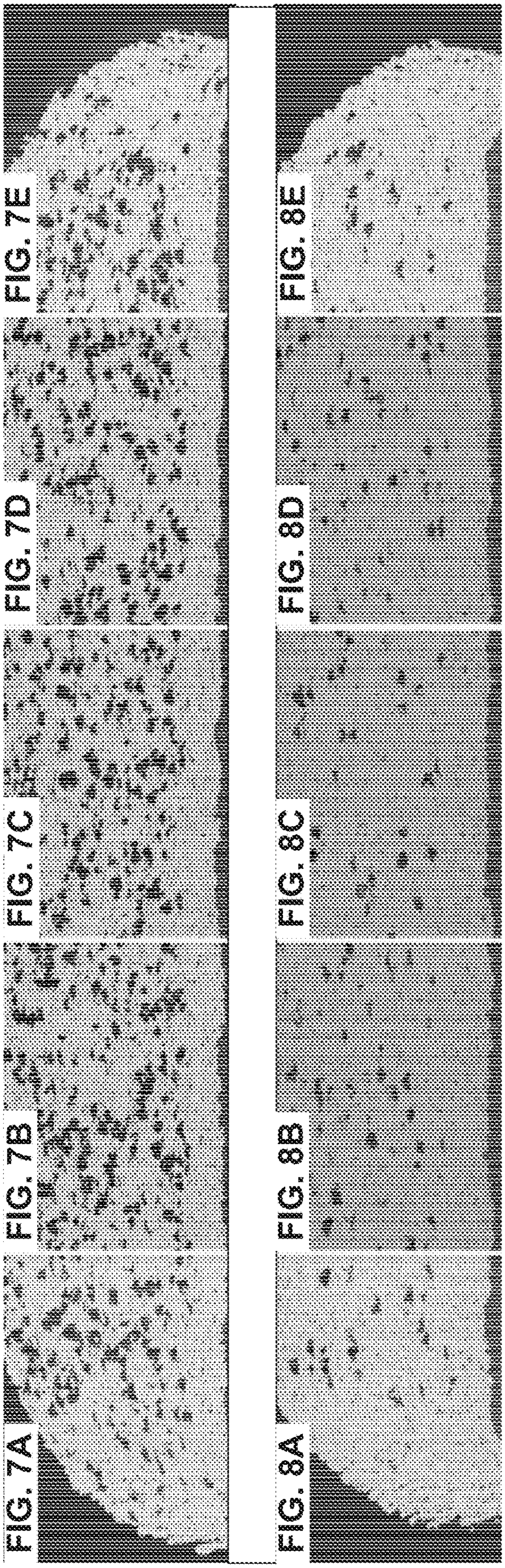

As illustrated in FIG. 6D, spatial homogeneity parameter R2 of image 500 may be reduced relative to spatial homogeneity parameter R1 of image 400, because the black pixels 502 indicative of void volumes in an associated layer are relative more homogenously distributed relative image 400. In this way, the determined spatial homogeneity parameter may quantify the spatial homogeneity of a layer such as thermally-sprayed coating layer.

FIG. 7A-8E are micrographs illustrating example thermally-sprayed layers, each thermally-sprayed layer defining a porosity. The example thermally-sprayed layers were analyzed using image processing techniques according to the present disclosure to determine a spatial homogeneity parameter. FIGS. 7A-7E are example layers formed at a nominal porosity of 25 volume percent. Put differently, the void fraction of the example layers of FIGS. 7A-7E are all about 0.25. FIGS. 8A-8E are example layers formed at a nominal porosity of 10 percent. Pixels in the edges or corners of the example layer that are not indicative of the layer but are included as a function of the zoom of the imaging device, or the geometry of the layer, may be removed, by computing device 212 before performing the image analysis technique. For example, pixels outside the boundary of the layer (e.g., part of another layer, a substrate, or part of an environment surrounding the layer) may be removed by computing device 212, such as by a manual crop or automatic crop function.

With reference to FIGS. 7A-7E of layers formed at a nominal porosity of 25 volume percent, the determined spatial homogeneity parameters were 0.3445, 0.4809, 0.2246, 0.3546, and 0.3415, respectively. With reference to FIGS. 8A-8E of layers formed at a nominal porosity of 10 volume percent, the determined spatial homogeneity parameters were 0.3271, 0.2859, 0.2926, and 0.2634, respectively. As demonstrated by these examples, image processing techniques according to the present disclosure may be performed to generate a quantification of the porosity of a thermally-sprayed layer. The determined spatial homogeneity parameter may be used to control thermal spray operations of a thermal spray system. For example, the determined spatial homogeneity parameter may be compared to a threshold spatial homogeneity parameter, and, responsive to determining that the spatial homogeneity parameter exceeds the threshold spatial homogeneity parameter, computing device 212 may control (e.g., adjust) at least one parameter of a thermal spray gun (120, FIG. 2).

Figure 9:
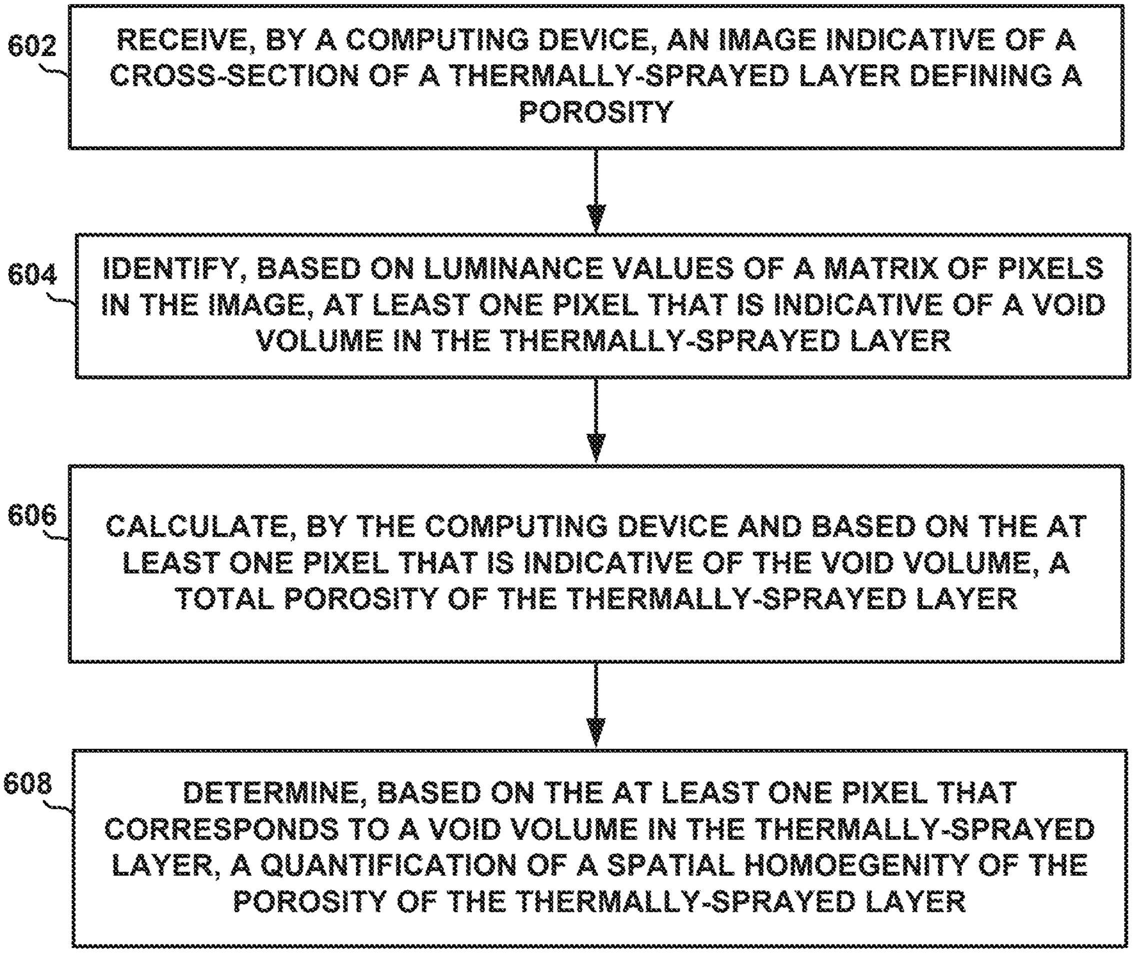
FIG. 9 is a flowchart illustrating an example method for determining a spatial homogeneity of a porosity of a thermally-sprayed layer, according to one or more examples of the present disclosure.

FIG. 9 is a flowchart illustrating an example method for determining a spatial homogeneity of a porosity of a thermally-sprayed layer, according to one or more examples of the present disclosure. The technique of FIG. 8 will be described with reference to layer 10A of FIG. 1, thermal spray system 100 of FIG. 2, and computing device 212 of FIG. 3, although the layer 10 may deposited by another system using another technique. Furthermore, the described technique may be used to deposit other layers, and may be performed using other systems.

Computing device 212 may receive an image indicative of a cross-section of layer 10A (602). In some examples, the image indicative of a cross-section of layer 10A (e.g., FIG. 1A) may be received by computing device 212, and the image may include a matrix of individual pixels. The image may be captured by imaging device 140. The image may be a micrograph, and may be in black and white or in color. Each pixel in the matrix of pixels may define a luminance value. The luminance value may be the brightness intensity. In some examples, the brightness intensity may range from a luminance value of zero to indicate a black color to a luminance value of, for example, 255 to indicate a white color. Other scales of luminance values are also considered. Further, other examples are also considered, such as where the maximum luminance value is indicative of a black color and the minimum luminance value is indicative of a white color. In examples where the image is a color image, each pixel in the matrix of pixels may include a luminance value for each of a red color, a yellow color, and a blue color. In some examples, the technique may include determining an overall luminance value by, for example, summing or averaging the luminance values for each of the red color, the yellow color, and the blue color. The technique may then proceed based on the determined overall luminance value.

Porosity determination module 256 may identify, based on luminance values of the matrix of pixels in the received image, at least one pixel that is indicative of a void volume in layer 10A (604). In some examples, void volumes may be pores 12A, but other void volumes are also considered, such as thin splat lines formed between lamellae 16A. Porosity determination module 256 may calculate, based on the at least one pixel indicative of the void volumes, a total porosity of the thermally sprayed layer (606). In some examples, calculating the total porosity may include summing, by porosity determination module 256, the at least one pixel that is indicative of the void volume within layer 10A and comparing to a total number of pixels in the matrix of pixels.

Homogeneity module 262 may determine, based on the at least one pixel that is indicative of the void volume in layer 10, a quantification of a spatial homogeneity of the porosity of layer 10A (608). In some examples, the quantification of the spatial homogeneity of the porosity of layer 10A may be a spatial homogeneity parameter. In some examples, to generate the spatial homogeneity parameter, spatial homogeneity module 250 may execute submodules window dimensions module 258 and/or porosity deviation module 260 to form an analysis window (406, FIG. 5B) in the image, calculate a regional porosity of the portion of layer 10A represented in the analysis window, compare the regional porosity to the total porosity, determine a porosity deviation parameter, and iteratively move the analysis window to a plurality of locations (406A, 406B, 406C, FIG. 5C) in the image, determining a porosity deviation parameter at each respective location of the plurality of locations.

Optionally, in some examples normalizing module 252 may normalize the raw image to generate a grayscale image. The grayscale image may have reduced or eliminated brightness gradients that may result from the way the raw image is captured or other artificial means. For example, a flash associated with imaging device 140 may cause a central portion of the raw image to appear brighter than the perimeter of the image, and executing normalization module 252 may correct for the camera flash. In some examples, normalization module 252 may adjust a luminance value of at least one pixel of the matrix of pixels. For example, adjusting the luminance value of at least one pixel may include determining a background luminance value for each individual pixel in the matrix of pixels, and subtracting the background luminance value from each individual pixel luminance value. The resulting normalized image may be a grayscale image, which may result in a more accurate representation of layer 10A.

Optionally, in some examples binary conversion module 254 converts, based on the luminance values, the received image into a binary image. In some examples, binary conversion module 254 assigns each pixel in the matrix of pixels to a luminance value that is equal to a luminance value of a black color or a luminance value that is equal to a white color. By way of example, if the scale of luminance values ranges from zero to 255, those pixels that have a luminance value from zero to 127 may be adjusted to have a luminance value of zero. Accordingly, those pixels that have a luminance value from 128 to 255 may be adjusted to have a luminance value of 255. In this way, the image may be converted into a binary image consisting of only pixels that are white or black.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following examples and claims.

Example 1: A method includes receiving, by a computing device, an image indicative of a cross-section of a thermally-sprayed layer, the thermally-sprayed layer defining a porosity comprising a void volume of the thermally-sprayed layer, wherein the image comprises a matrix of pixels, each pixel in the matrix of pixels defining a respective luminance value of a plurality of luminance values; identifying, by the computing device and based on the plurality of luminance values, at least one pixel that is indicative of a void volume in the thermally-sprayed layer; calculating, by the computing device and based on the at least one pixel that is indicative of the void volume in the thermally-sprayed layer, a total porosity of the thermally-sprayed layer; and determining, by the computing device and based on the at least one pixel that is indicative of a void volume in the thermally-sprayed layer, a quantification of a spatial homogeneity of the porosity of the thermally-sprayed layer.

Example 2: The method of example 1, wherein determining the quantification of a spatial homogeneity of the porosity of the layer comprises: calculating the total porosity by summing the at least one pixel that is indicative of the void volume within the thermally-sprayed layer and comparing to a total number of pixels in the matrix of pixels; determining, by the computing device, an analysis window, the analysis window comprising a set of pixels indicative of a portion of the thermally-sprayed layer in the image, and the analysis window comprising a portion of the matrix of pixels in the image; identifying, by the computing device and based on the luminance values, at least one pixel indicative of a void volume in the analysis window; determining, by the computing device, a regional porosity of the portion of the thermally-sprayed layer in the analysis window by summing the at least one pixel indicative of the void volume within the analysis window and comparing to a total number of pixels in the analysis window; and determining the quantification of the spatial homogeneity of the porosity of the thermally-sprayed layer at least partially by comparing the determined regional porosity to the determined total porosity.

Example 3: The method of example 2, wherein forming the analysis window comprises: determining, by the computing device, a dimensional term by determining the inverse of the total porosity, determining, by the computing device, in pixels, a width and a height of the matrix of pixels making up the image, setting, by the computing device, the dimensions of the analysis window by dividing each of the width and the height of the matrix of pixels by the dimensional term.

Example 4: The method of example 3, wherein comparing the determined regional porosity to the determined total porosity comprises determining a porosity deviation parameter.

Example 5: The method of example 4, wherein the porosity deviation parameter is equal to an absolute value of a difference between the regional porosity, expressed as a void fraction, and the total porosity of the thermally-sprayed layer, expressed as a void fraction, multiplied by the dimensional term.

Example 6: The method of example 5, wherein the analysis window is positioned at a first location within the image, and the method further comprises moving, by the computing device, the analysis window to a second location within the image, the second location comprising a set of pixels indicative a different portion of the thermally-sprayed layer in the image, determining a regional porosity of the portion of the thermally-sprayed layer in the analysis window in the second location, and determining a porosity deviation parameter of the portion of the thermally-sprayed layer in the analysis window in the second location.

Example 7: The method of example 6, further comprising moving, by the computing device, the analysis window to a third location within the image, wherein the third location comprises a set of pixels indicative of a different portion of the thermally-sprayed layer than the analysis window of the second location, and determining the porosity deviation parameter of the portion of the thermally-sprayed layer in the analysis window in the third location.

Example 8: The method of any of examples 6 and 7, further comprising iteratively moving, by the computing device, the analysis window a plurality of times to a plurality of locations and determining the porosity deviation parameter of the portion of the thermally-sprayed layer in the analysis window in each respective location of the plurality of locations, wherein the plurality of locations numbers at least 1,000 locations.

Example 9: The method of example 8, wherein iteratively moving the analysis window comprises randomly moving, by the computing device, the analysis window in at least one direction with reference to an immediately previous location of the analysis window.

Example 10: The method of any of examples 8 and 9, further comprising determining a spatial homogeneity parameter based at least partially on the determined porosity deviation parameter at each of the at least 1,000 new locations.

Example 11: The method of example 10, wherein determining the spatial homogeneity parameter comprises determining, by the computing device, a range of determined porosity deviation parameters, and wherein the method further comprises, by the computing device, setting the spatial homogeneity parameter equal to the determined range of determined porosity deviation parameters.

Example 12: The method of example 11, further includes comparing, by the computing device, the determined spatial homogeneity parameter to a threshold spatial homogeneity parameter, and responsive to determining that the determined spatial homogeneity parameter exceeds the threshold spatial homogeneity parameter, controlling, by the computing device, at least one parameter of a thermal spray gun configured to apply the thermally-sprayed coating.

Example 13: The method of any of examples 1 through 12, further comprising normalizing the image, wherein normalizing the image comprises adjusting, by the computing device, a luminance value of at least one pixel of the matrix of pixels.

Example 14: The method of example 13, wherein normalizing, by the computing device, the image comprises correcting for non-uniform illumination of the cross-section of the thermally-sprayed layer by reducing or eliminating brightness gradients within the image.

Example 15: The method of any of examples 13 and 14, wherein normalizing the image comprises generating, by the computing device, a grayscale image, and wherein generating the grayscale image is performed prior to determining the at least one pixel that is indicative of the void volume in the thermally-sprayed layer.

Example 16: The method of any of examples 1 through 15, further comprising converting, by the computing device and based on the luminance values, the image into a binary image, and wherein converting the image into a binary image is performed prior to determining the at least one pixel that is indicative of the void volume in the thermally-sprayed layer.

Example 17: The method of any of examples 6 through 16, wherein converting the image into a binary image comprises assigning each pixel of the plurality of pixels in the matrix of pixels that make up the image to a luminance value that is equal to a luminance value of a black color or a luminance value that is equal to a white color.

Example 18: The method of any of examples 7 through 17, wherein the luminance value that is equal to a black color is zero.

Example 19: A non-transitory computer-readable storage medium having stored thereon instructions that, when executed, configure a processor to: receive an image indicative of a cross-section of a thermally-sprayed layer, the thermally-sprayed layer defining a porosity, wherein the image comprises a matrix of pixels, each pixel in the matrix of pixels defining a respective luminance value of a plurality of luminance values; identify, based on the plurality of luminance values, at least one pixel that is indicative of a void volume in the thermally-sprayed layer; calculate, based on the at least one pixel that is indicative of the void volume in the thermally-sprayed layer, a total porosity of the thermally-sprayed layer; and determining, by the computing device and based on the at least one pixel that is indicative of a void volume in the thermally-sprayed layer, a quantification of a spatial homogeneity of the porosity of the thermally-sprayed layer.

Example 20: A system includes a thermal spray gun configured to apply a thermally-sprayed coating layer to a substrate; an imaging device configured to capture an image indicative of a cross-section of the thermally-sprayed layer, the thermally-sprayed layer defining a porosity, wherein the image comprises a matrix of pixels, each pixel in the matrix of pixels defining a luminance value; and a computing device configured to: receive the image indicative of the cross-section of the thermally-sprayed layer; identify, based on the luminance values, at least one pixel that is indicative of a void volume in the thermally-sprayed layer; calculate, based on the at least one pixel that is indicative of the void volume in the thermally-sprayed layer, a total porosity of the thermally-sprayed layer; and determine, based on the at least one pixel that corresponds to a void volume in the thermally-sprayed layer, a quantification of a spatial homogeneity of the porosity of the thermally-sprayed layer.

What is claimed is:

1. A method comprising:

receiving, by a computing device, an image indicative of a cross-section of a thermally-sprayed layer, the thermally-sprayed layer defining a porosity comprising a void volume of the thermally-sprayed layer, wherein the image comprises a matrix of pixels, each pixel in the matrix of pixels defining a respective luminance value of a plurality of luminance values;

identifying, by the computing device and based on the plurality of luminance values, at least one pixel that is indicative of a void volume in the thermally-sprayed layer;

calculating, by the computing device and based on the at least one pixel that is indicative of the void volume in the thermally-sprayed layer, a total porosity of the thermally-sprayed layer; and determining, by the computing device and based on the at least one pixel that is indicative of a void volume in the thermally-sprayed layer, a quantification of a spatial homogeneity of the porosity of the thermally-sprayed layer.

2. The method of claim 1, wherein determining the quantification of a spatial homogeneity of the porosity of the layer comprises:

calculating the total porosity by summing the at least one pixel that is indicative of the void volume within the thermally-sprayed layer and comparing to a total number of pixels in the matrix of pixels;

determining, by the computing device, an analysis window, the analysis window comprising a set of pixels indicative of a portion of the thermally-sprayed layer in the image, and the analysis window comprising a portion of the matrix of pixels in the image;

identifying, by the computing device and based on the luminance values, at least one pixel indicative of a void volume in the analysis window;

determining, by the computing device, a regional porosity of the portion of the thermally-sprayed layer in the analysis window by summing the at least one pixel indicative of the void volume within the analysis window and comparing to a total number of pixels in the analysis window; and determining the quantification of the spatial homogeneity of the porosity of the thermally-sprayed layer at least partially by comparing the determined regional porosity to the determined total porosity.

3. The method of claim 2, wherein forming the analysis window comprises:

determining, by the computing device, a dimensional term by determining the inverse of the total porosity, determining, by the computing device, in pixels, a width and a height of the matrix of pixels making up the image, setting, by the computing device, the dimensions of the analysis window by dividing each of the width and the height of the matrix of pixels by the dimensional term.

4. The method of claim 3, wherein comparing the determined regional porosity to the determined total porosity comprises determining a porosity deviation parameter.

5. The method of claim 4, wherein the porosity deviation parameter is equal to an absolute value of a difference between the regional porosity, expressed as a void fraction, and the total porosity of the thermally-sprayed layer, expressed as a void fraction, multiplied by the dimensional term.

6. The method of claim 5, wherein the analysis window is positioned at a first location within the image, and the method further comprises moving, by the computing device, the analysis window to a second location within the image, the second location comprising a set of pixels indicative of a different portion of the thermally-sprayed layer in the image, determining a regional porosity of the portion of the thermally-sprayed layer in the analysis window in the second location, and determining a porosity deviation parameter of the portion of the thermally-sprayed layer in the analysis window in the second location.

7. The method of claim 6, further comprising moving, by the computing device, the analysis window to a third location within the image, wherein the third location comprises a set of pixels indicative of a different portion of the thermally-sprayed layer than the analysis window of the second location, and determining the porosity deviation parameter of the portion of the thermally-sprayed layer in the analysis window in the third location.

8. The method of claim 6, further comprising iteratively moving, by the computing device, the analysis window a plurality of times to a plurality of locations and determining the porosity deviation parameter of the portion of the thermally-sprayed layer in the analysis window in each respective location of the plurality of locations, wherein the plurality of locations numbers at least 1,000 locations.

9. The method of claim 8, wherein iteratively moving the analysis window comprises randomly moving, by the computing device, the analysis window in at least one direction with reference to an immediately previous location of the analysis window.

10. The method of claim 8, further comprising determining a spatial homogeneity parameter based at least partially on the determined porosity deviation parameter at each of the at least 1,000 new locations.

11. The method of claim 10, wherein determining the spatial homogeneity parameter comprises determining, by the computing device, a range of determined porosity deviation parameters, and wherein the method further comprises, by the computing device, setting the spatial homogeneity parameter equal to the determined range of determined porosity deviation parameters.

12. The method of claim 11, further comprising:

comparing, by the computing device, the determined spatial homogeneity parameter to a threshold spatial homogeneity parameter, and responsive to determining that the determined spatial homogeneity parameter exceeds the threshold spatial homogeneity parameter, controlling, by the computing device, at least one parameter of a thermal spray gun configured to apply the thermally-sprayed coating.

13. The method of claim 1, further comprising normalizing the image, wherein normalizing the image comprises adjusting, by the computing device, a luminance value of at least one pixel of the matrix of pixels.

14. The method of claim 13, wherein normalizing, by the computing device, the image comprises correcting for non-uniform illumination of the cross-section of the thermally-sprayed layer by reducing or eliminating brightness gradients within the image.

15. The method of claim 13, wherein normalizing the image comprises generating, by the computing device, a grayscale image, and wherein generating the grayscale image is performed prior to determining the at least one pixel that is indicative of the void volume in the thermally-sprayed layer.

16. The method of claim 1, further comprising converting, by the computing device and based on the luminance values, the image into a binary image, and wherein converting the image into a binary image is performed prior to determining the at least one pixel that is indicative of the void volume in the thermally-sprayed layer.

17. The method of claim 16, wherein converting the image into a binary image comprises assigning each pixel of the plurality of pixels in the matrix of pixels that make up the image to a luminance value that is equal to a luminance value of a black color or a luminance value that is equal to a white color.

18. The method of claim 17, wherein the luminance value that is equal to a black color is zero.

19. A non-transitory computer-readable storage medium having stored thereon instructions that, when executed, configure a processor to:

receive an image indicative of a cross-section of a thermally-sprayed layer, the thermally-sprayed layer defining a porosity, wherein the image comprises a matrix of pixels, each pixel in the matrix of pixels defining a respective luminance value of a plurality of luminance values;

identify, based on the plurality of luminance values, at least one pixel that is indicative of a void volume in the thermally-sprayed layer;

calculate, based on the at least one pixel that is indicative of the void volume in the thermally-sprayed layer, a total porosity of the thermally-sprayed layer; and determine, based on the at least one pixel that is indicative of a void volume in the thermally-sprayed layer, a quantification of a spatial homogeneity of the porosity of the thermally-sprayed layer.

20. A system comprising:

a thermal spray gun configured to apply a thermally-sprayed coating layer to a substrate;

an imaging device configured to capture an image indicative of a cross-section of the thermally-sprayed layer, the thermally-sprayed layer defining a porosity, wherein the image comprises a matrix of pixels, each pixel in the matrix of pixels defining a luminance value; and a computing device configured to:

receive the image indicative of the cross-section of the thermally-sprayed layer;

identify, based on the luminance values, at least one pixel that is indicative of a void volume in the thermally-sprayed layer;

calculate, based on the at least one pixel that is indicative of the void volume in the thermally-sprayed layer, a total porosity of the thermally-sprayed layer; and determine, based on the at least one pixel that corresponds to a void volume in the thermally-sprayed layer, a quantification of a spatial homogeneity of the porosity of the thermally-sprayed layer.

* * * * *